(12) United States Patent
Karasudani et al.

(10) Patent No.: US 10,235,118 B2
(45) Date of Patent: Mar. 19, 2019

(54) AUGMENTED REALITY DEVICE AND METHOD FOR PROVIDING ASSISTANCE TO A WORKER AT A REMOTE SITE

(71) Applicant: FUJITSU LIMITED, Kawasaki-shi, Kanagawa (JP)

(72) Inventors: Ayu Karasudani, Yamato (JP); Nobuyasu Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 15/243,059

(22) Filed: Aug. 22, 2016

(65) Prior Publication Data

US 2017/0061631 A1 Mar. 2, 2017

(30) Foreign Application Priority Data

Aug. 27, 2015 (JP) ................................. 2015-167814

(51) Int. Cl.
*G06T 19/00* (2011.01)
*G06F 3/14* (2006.01)
(Continued)

(52) U.S. Cl.
CPC ................ *G06F 3/14* (2013.01); *G06F 3/011* (2013.01); *G06F 3/017* (2013.01);
(Continued)

(58) Field of Classification Search
CPC . G06F 3/14; G06F 3/017; G06F 3/011; G06K 9/00201; G06K 9/00771;
(Continued)

(56) References Cited

U.S. PATENT DOCUMENTS 6,466,815 B1 10/2002 Saito et al.
2006/0238617 A1 10/2006 Tamir
(Continued)

FOREIGN PATENT DOCUMENTS

JP 11-309269 11/1999
JP 2000-279425 10/2000
(Continued)

OTHER PUBLICATIONS

Extended Search Report dated Feb. 24, 2017 in European Patent Application No. 16185104.3.
(Continued)

*Primary Examiner* — Diane M Wills
(74) *Attorney, Agent, or Firm* — Oblon, McClelland, Maier & Neustadt, L.L.P.

(57) ABSTRACT

An image processing method includes acquiring a three-dimensional model obtained by modeling a plurality of objects included in a work space, acquiring, from a camera which is hold by a user, an image captured by the camera, the user existing in the work space, acquiring, from a sensor which is hold by the user, distance information indicating distances between the sensor and each of the plurality of objects, determining a position of the user in the work space based on the three-dimensional model and the distance information, identifying a predetermined region closest to the position of the user among at least one of predetermined regions defined in the three-dimensional model, generating a display screen displaying the predetermined region and the image, and outputting the display screen to another computer.

20 Claims, 23 Drawing Sheets

(51) Int. Cl.
   *G06F 3/01* (2006.01)
   *G06K 9/00* (2006.01)
   *G06T 1/00* (2006.01)
   *G06T 17/00* (2006.01)
(52) U.S. Cl.
   CPC ..... *G06K 9/00201* (2013.01); *G06K 9/00375* (2013.01); *G06K 9/00671* (2013.01); *G06K 9/00771* (2013.01); *G06T 1/0007* (2013.01); *G06T 17/00* (2013.01); *G06T 19/006* (2013.01); *G06T 2207/30196* (2013.01)
(58) Field of Classification Search
   CPC ............ G06K 9/00375; G06K 9/00671; G06T 17/00; G06T 1/0007; G06T 19/006; G06T 2207/30196
   See application file for complete search history.

(56) References Cited

U.S. PATENT DOCUMENTS

| | | | |
|---|---|---|---|
| 2009/0019402 A1 | 1/2009 | Ke et al. | |
| 2009/0163274 A1 | 6/2009 | Kando et al. | |
| 2010/0315416 A1 | 12/2010 | Pretlove et al. | |
| 2012/0176410 A1 | 7/2012 | Meier et al. | |
| 2012/0249741 A1* | 10/2012 | MacIocci | G06F 3/011 348/46 |
| 2013/0093787 A1* | 4/2013 | Fulks | G06T 11/60 345/629 |
| 2013/0342564 A1* | 12/2013 | Kinnebrew | G09G 3/003 345/619 |
| 2014/0168266 A1 | 6/2014 | Kimura | |
| 2014/0204000 A1* | 7/2014 | Sato | H04W 64/00 345/2.3 |
| 2015/0015611 A1 | 1/2015 | Meier et al. | |
| 2015/0294570 A1* | 10/2015 | Emura | G08G 1/166 340/435 |
| 2015/0356763 A1* | 12/2015 | Fulks | G06T 11/60 345/629 |
| 2016/0379591 A1* | 12/2016 | Oya | G06T 19/006 345/633 |

FOREIGN PATENT DOCUMENTS

| | | |
|---|---|---|
| JP | 2009-43242 | 2/2009 |
| JP | 2014-174507 | 9/2014 |

OTHER PUBLICATIONS

Partial European Search Report dated Dec. 13, 2016 in patent application No. 16185104.3.

Office Action dated Dec. 13, 2018 in European Application No. 16185104.3.

* cited by examiner

FIG. 11
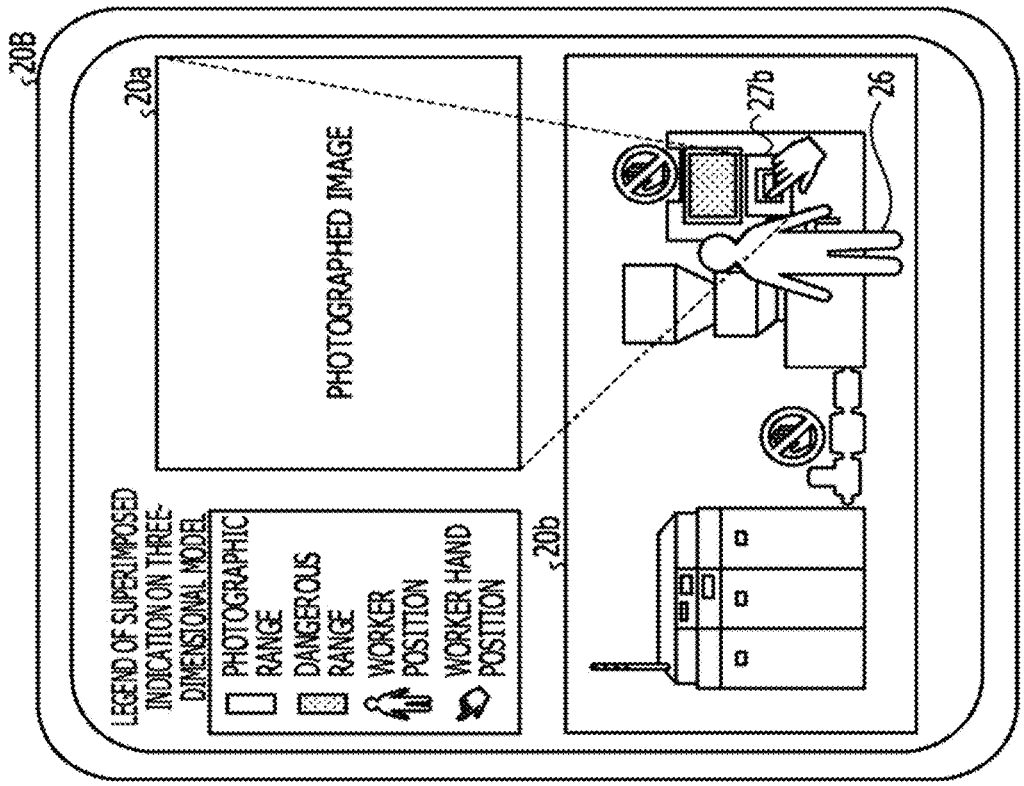
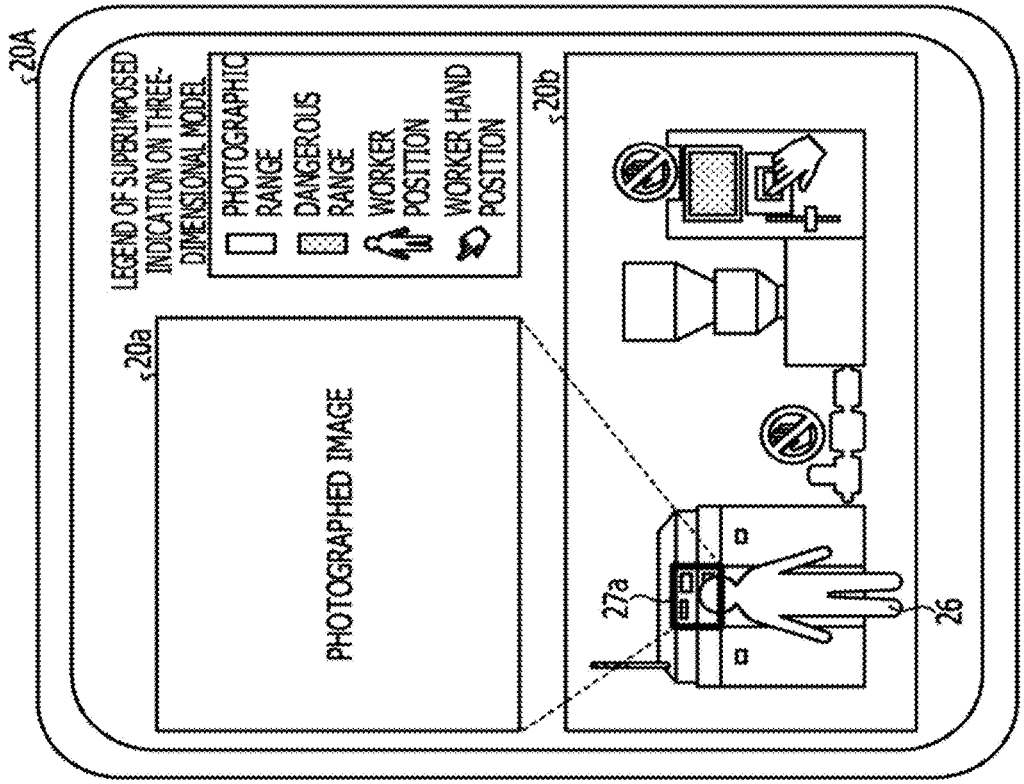

FIG. 18

| DISTANCE d1 | DISTANCE d2 | ANGLE $\theta$ |
|---|---|---|
| 1 cm OR SHORTER | 10 cm OR SHORTER | 90deg |
| ... | ... | ... |
| 5cm | 30cm | 45deg |
| ... | ... | ... |
| 10 cm OR LONGER | 50 cm OR LONGER | 0deg |

AUGMENTED REALITY DEVICE AND METHOD FOR PROVIDING ASSISTANCE TO A WORKER AT A REMOTE SITE

CROSS-REFERENCE TO RELATED APPLICATION

This application is based upon and claims the benefit of priority of the prior Japanese Patent Application No. 2015-167814, filed on Aug. 27, 2015, the entire contents of which are incorporated herein by reference.

FIELD

Techniques disclosed in the present embodiments are related to an image processing device and so forth.

BACKGROUND

In recent years, an augmented reality (AR) technique has existed in which additional information is displayed in a superimposed manner by computer graphics and so forth on a screen of a terminal device used by a worker at a work site and assistance for work is carried out.

FIG. 23 is a diagram illustrating one example of the AR technique. As illustrated in FIG. 23, for example, when a user photographs a marker 11 and a check target 12 by using a camera incorporated in a portable terminal 10, object information 13 with respect to the marker 11 is superimposed on a display screen 10a of the portable terminal 10.

There is conventional technique 1 in which, by applying this AR technique, a worker transmits a photographed image photographed by a camera to a remote assistance person who is not present at the site and the remote assistance person makes an instruction of work to the worker while viewing the transmitted photographed image. For example, in conventional technique 1, the remote instruction person assists the worker with work by giving a marker to a work target included in the photographed image and causing the photographed image given the marker to be displayed on the terminal device of the worker at the work site.

Furthermore, conventional technique 2 exists in which, in order to support a doctor who carries out an operation, information on a dangerous range is set in advance in a three-dimensional model of an affected area of a patient and the distance between a hand of the doctor and the dangerous range is displayed on a photographed image by a camera in a superimposed manner.

The techniques related to the conventional technique are disclosed in Japanese Laid-open Patent Publication No. 2009-43242, Japanese Laid-open Patent Publication No. 2000-279425, Japanese Laid-open Patent Publication No. 2014-174507, and Japanese Laid-open Patent Publication No. 11-309269, for example.

SUMMARY

According to an aspect of the embodiments, an image processing method executed by a computer, the image processing method comprising: acquiring a three-dimensional model obtained by modeling a plurality of objects included in a work space; acquiring, from a camera which is hold by a user, an image captured by the camera, the user existing in the work space; acquiring, from a sensor which is hold by the user, distance information indicating distances between the sensor and each of the plurality of objects; determining a position of the user in the work space based on the three-dimensional model and the distance information; identifying a predetermined region closest to the position of the user among at least one of predetermined regions defined in the three-dimensional model; generating a display screen displaying the predetermined region and the image; and outputting the display screen to another computer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram for explaining another kind of processing (1) of the generating unit;

FIG. 18 is a diagram illustrating one example of a data structure of a rotation amount table;

DESCRIPTION OF EMBODIMENTS

However, in the above-described conventional techniques, there is a problem that it is difficult for the work assistance person to easily grasp the situation of the worker at the work site.

For example, in conventional technique 1, the worker and the remote assistance person share a two-dimensional photographed image and therefore it is difficult for the work assistance person to grasp a sense of distance between the worker and the work target and so forth and grasp the situation of the work.

Furthermore, in conventional technique 2, it is difficult to grasp the situation of the worker in the whole work space although the local distance between the dangerous range and the worker can be grasped.

In one aspect, the embodiments intend to provide an image processing device, an image processing method, and an image processing program that allow a work assistance person to easily grasp the situation of a worker at a work site.

Embodiments of an image processing device, an image processing method, and an image processing program disclosed by the present application will be described in detail below with reference to the drawings. This invention is not limited by the embodiments.

Embodiment 1

Figure 1:
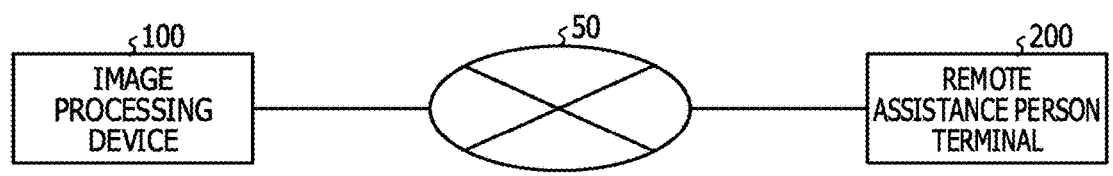
FIG. 1 is a diagram illustrating a configuration of a remote work assistance system according to present embodiment 1.

FIG. 1 is a diagram illustrating a configuration of a remote work assistance system according to the present embodiment 1. As illustrated in FIG. 1, the remote work assistance system includes an image processing device 100 and a remote assistance person terminal 200. For example, the image processing device 100 and the remote assistance person terminal 200 are mutually coupled via a network 50.

The image processing device 100 is a device used by a worker at a work site. The image processing device 100 notifies the remote assistance person terminal 200 of information on a photographed image photographed by a camera. Furthermore, when transmitting the information on the photographed image to the remote assistance person terminal 200, the image processing device 100 determines the work position of the worker from a three-dimensional model of the work space and three-dimensional distance information of a distance sensor. The image processing device 100 generates a display screen including information on the direction and distance of a dangerous region or a work region from the work position of the worker and notifies the remote assistance person terminal 200 of the display screen in conjunction with the information on the photographed image.

The remote assistance person terminal 200 is a device used by an assistance person who assists the worker with work. For example, the remote assistance person terminal 200 displays the display screen notified from the image processing device 100. The remote assistance person thereby grasps the work situation of the worker and carries out various kinds of assistance.

Figure 2:
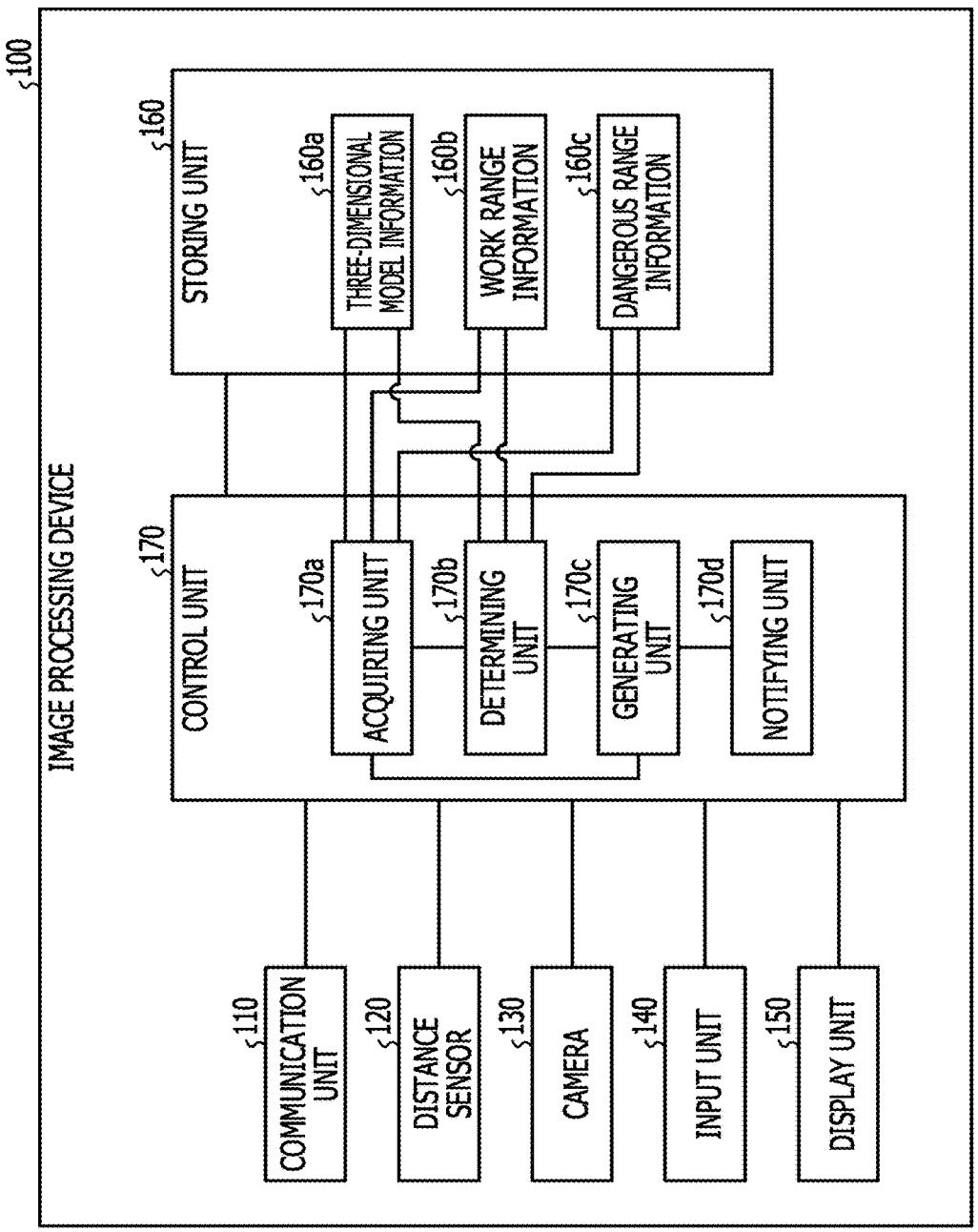
FIG. 2 is a functional block diagram illustrating a configuration of an image processing device according to the present embodiment 1.

FIG. 2 is a functional block diagram illustrating a configuration of the image processing device according to the present embodiment 1. As illustrated in FIG. 2, this image processing device 100 includes a communication unit 110, a distance sensor 120, a camera 130, an input unit 140, a display unit 150, a storing unit 160, and a control unit 170. For example, the distance sensor 120 and the camera 130 are set on a helmet or the like worn by a worker at the time of work.

The communication unit 110 is a communication device that carries out data communications with the remote assistance person terminal 200 via the network 50. The control unit 170 to be described later transmits and receives data via the communication unit 110.

The distance sensor 120 is a sensor that measures the three-dimensional distance from the distance sensor 120 to an object included in the measurement range. For example, the distance sensor 120 measures the three-dimensional distance on the basis of a triangulation system, time-of-flight, or the like. In the following description, information on the three-dimensional distance measured by the distance sensor 120 will be represented as three-dimensional distance information. The distance sensor 120 outputs the three-dimensional distance information to the control unit 170.

The camera 130 is a device that photographs an image of a photographic range. The image photographed by the camera 130 will be represented as the photographed image. The camera 130 outputs information on the photographed image to the control unit 170. For example, the camera 130 may be mounted on a head mounted display (HMD) the worker wears at the head.

Figure 3:
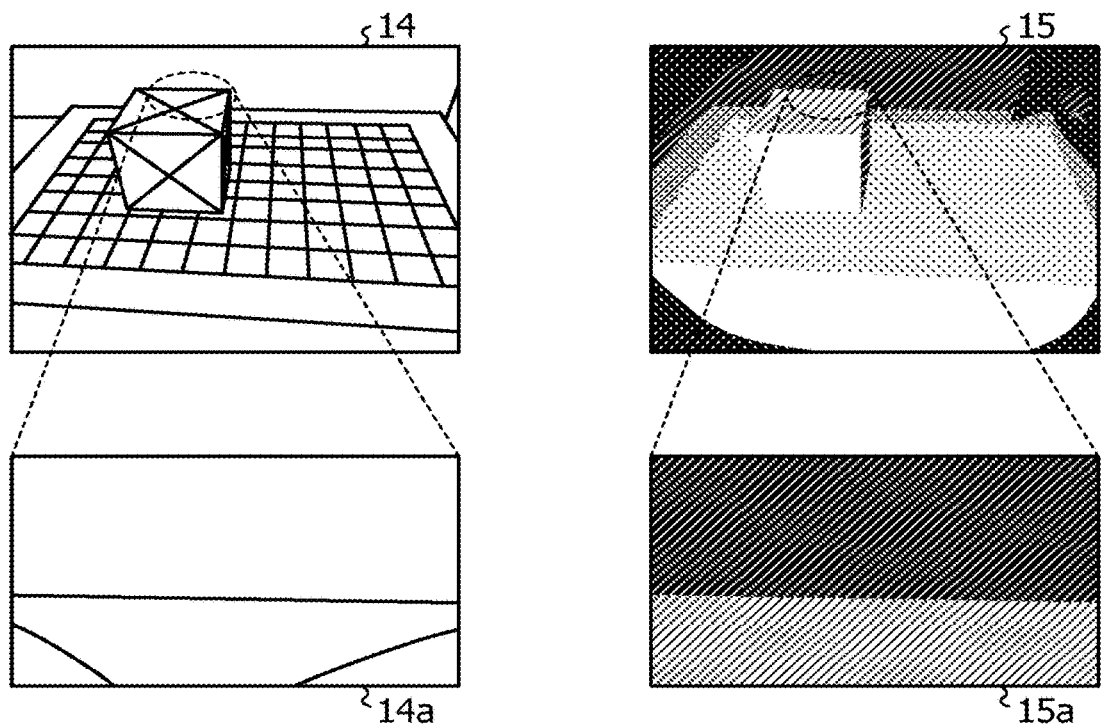
FIG. 3 is a diagram illustrating one example of a photographed image and an image based on three-dimensional distance information.

FIG. 3 illustrates one example of a photographed image and an image based on three-dimensional distance information. In FIG. 3, an image 14 is the photographed image and an image 15 is the image based on three-dimensional distance information. This image based on three-dimensional distance information is expressed in such a manner that a closer part is brighter (hatching is coarser or white) and a farther part is darker (hatching is finer or black). When attention is paid to a partial image 14a of the image 14, it is difficult to grasp the distance. In contrast, when attention is paid to a partial image 15a of the image 15, the distance can be grasped on the basis of the thickness of the color.

The input unit 140 is an input device that inputs various kinds of information to the image processing device 100. The input unit 140 corresponds to an input device such as a touch panel and input buttons.

The display unit 150 is a display device that displays information output from the control unit 170. The display unit 150 corresponds to a liquid crystal display, a touch panel, or the like.

The storing unit 160 includes three-dimensional model information 160a, work range information 160b, and dangerous range information 160c. The storing unit 160 corresponds to a storing device such as a semiconductor memory element such as a random access memory (RAM), a read only memory (ROM), and a flash memory for example.

The three-dimensional model information 160a is information obtained by modeling the shapes of plural objects included in the work space. For example, the three-dimensional model information 160a disposes plural objects on the basis of the origin of a world coordinate system set in advance and defines the three-dimensional coordinates at which the objects are disposed and the shapes of the objects.

The work range information 160b is information that defines a work target on which a worker carries out work in the work space. For example, in the work range information 160b, the work target is defined by three-dimensional coordinates on the basis of the origin of the world coordinate system set in advance.

The dangerous range information 160c is information that defines a dangerous region in the work space. For example, in the dangerous range information 160c, the dangerous range is defined by three-dimensional coordinates on the basis of the origin of the world coordinate system set in advance.

Figure 4:
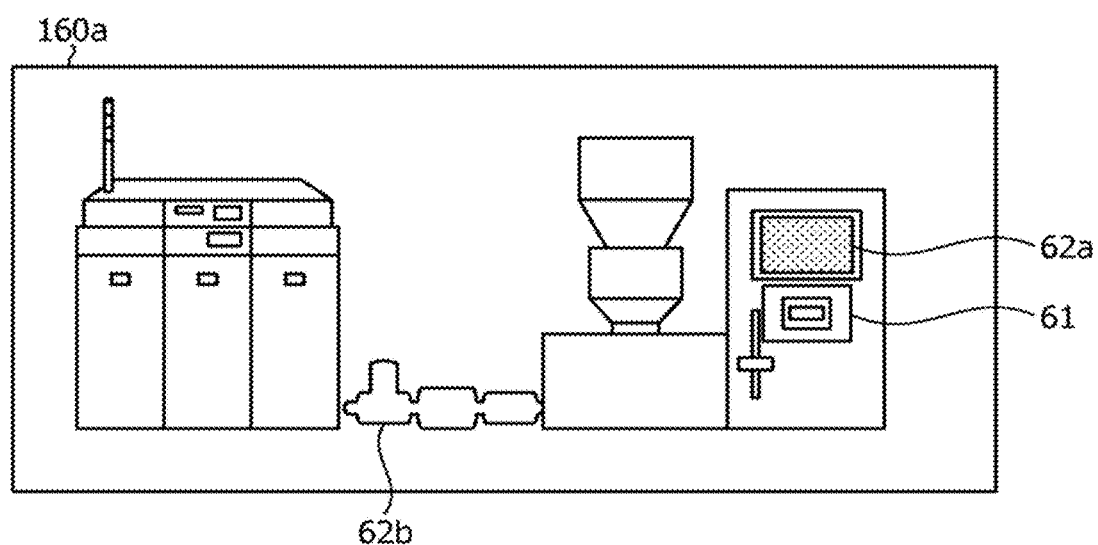
FIG. 4 is a diagram for explaining three-dimensional model information, work range information, and dangerous range information.

FIG. 4 is a diagram for explaining the three-dimensional model information, the work range information, and the dangerous range information. In FIG. 4, appearance when the three-dimensional model information 160a is viewed from the front side is illustrated. As illustrated in FIG. 4, the three-dimensional coordinates and shapes of various kinds of objects are defined in the three-dimensional model information 160a. When the work target corresponding to the work range information 160b is indicated by using the three-dimensional model information 160a, a work target 61 is obtained for example. When the dangerous range corresponding to the dangerous range information 160c is indicated by using the three-dimensional model information 160a, dangerous ranges 62a and 62b are obtained for example.

Referring back to FIG. 2, the control unit 170 includes an acquiring unit 170a, a determining unit 170b, a generating unit 170c, and a notifying unit 170d. The generating unit 170c is one example of a screen generating unit. The control unit 170 corresponds to an integrated device such as an application specific integrated circuit (ASIC) and a field programmable gate array (FPGA) for example. Furthermore, the control unit 170 corresponds to an electronic circuit such as a central processing unit (CPU) and a micro processing unit (MPU) for example.

The acquiring unit 170a acquires the three-dimensional model information 160a, the work range information 160b, and the dangerous range information 160c from the communication unit 110 or the input unit 140. The acquiring unit 170a stores, in the storing unit 160, the three-dimensional model information 160a, the work range information 160b, and the dangerous range information 160c that are acquired.

Furthermore, the acquiring unit 170a acquires three-dimensional distance information from the distance sensor 120 and outputs the acquired three-dimensional distance information to the determining unit 170b. The acquiring unit 170a acquires a photographed image from the camera 130 and outputs the acquired photographed image to the generating unit 170c.

The determining unit 170b is a processing unit that determines the work position of the worker on the basis of the three-dimensional distance information and the three-dimensional model information 160a. The determining unit 170b determines a work target close to the work position on the basis of the work position of the worker and the work range information 160b. The determining unit 170b determines a dangerous range close to the work position on the basis of the work position of the worker and the dangerous range information 160c. The determining unit 170b outputs the determination result to the generating unit 170c. In the following, one example of the processing of the determining unit 170b will be described.

Processing of determining the work position by the determining unit 170b will be described. Regarding the three-dimensional distance information and the three-dimensional model information 160a, the determining unit 170b carries out alignment between the respective points of the three-dimensional distance information and the respective points of the three-dimensional model information 160a on the basis of the iterative closest point (ICP). The determining unit 170b thereby estimates the three-dimensional coordinates of the camera 130. If the camera 130 is set on a helmet of the worker, the three-dimensional coordinates of the camera 130 correspond to the position of the head of the worker.

Furthermore, the determining unit 170b extracts a region of a hand of the worker from the difference between the three-dimensional distance information and the three-dimensional model information 160a. The determining unit 170b combines the three-dimensional coordinates of the head of the worker and the three-dimensional coordinates of the extracted region of the hand to thereby determine the work position of the worker.

Subsequently, processing of determining a work target close to the work position by the determining unit 170b will be described. The determining unit 170b calculates the traveling direction of the hand by repeatedly executing the processing of extracting the above-described hand region every time the three-dimensional distance information is accepted. The determining unit 170b compares a straight line extending along the traveling direction of the hand and the three-dimensional coordinates of the work target defined in the work range information 160b to determine the work target whose distance from the straight line is the shortest.

If the determining unit 170b fails at the extraction of the hand region or if the distance between the straight line and the work target is not within a prescribed distance, the determining unit 170b determines the work target on the basis of the central position of the field of view of the worker. For example, the determining unit 170b assumes the position of an object included in the central part of the three-dimensional distance information to be the central position of the field of view. The determining unit 170b determines the work target closest to the central position of the field of view.

Subsequently, processing of determining a dangerous range close to the work position by the determining unit 170b will be described. The determining unit 170b calculates the traveling direction of the hand similarly to the above-described processing. The determining unit 170b compares a straight line extending along the traveling direction of the hand and the three-dimensional coordinates of the dangerous range defined in the dangerous range information 160c to determine a dangerous range whose distance from the straight line is shorter than a prescribed distance D1.

Furthermore, the determining unit 170b determines a dangerous range whose distance from the present three-dimensional position of the hand is shorter than a prescribed distance D2. The determining unit 170b determines a dangerous range whose distance from the three-dimensional coordinates of the head of the worker is shorter than a prescribed distance D3. The above-described prescribed distances D1 to D3 are set in advance by an administrator. For example, the value of the prescribed distance D1 is set to a value larger than the value of the prescribed distance D2. Furthermore, the determining unit 170b may adjust the value of the prescribed distance D1 according to the movement speed of the hand. For example, the determining unit 170b decreases the value of the prescribed distance D1 as the speed of the hand increases.

The generating unit 170c is a processing unit that generates a display screen to be displayed by the remote assistance person terminal 200 on the basis of the determination result of the determining unit 170b. The generating unit 170c outputs information on the generated display screen to the notifying unit 170d.

Figure 5:
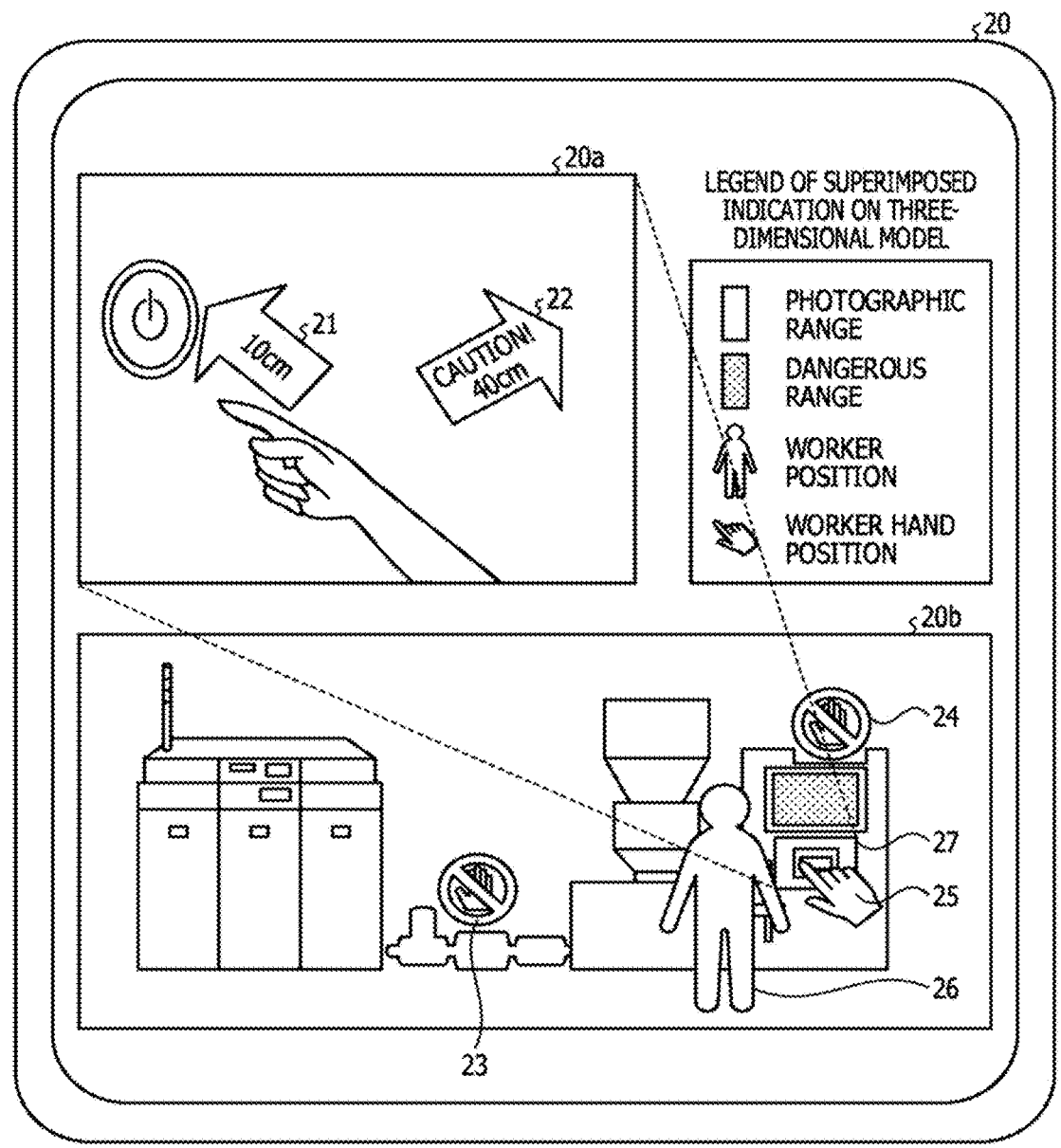
FIG. 5 is diagram (1) illustrating one example of a display screen generated by a generating unit according to the present embodiment 1.

FIG. 5 is diagram (1) illustrating one example of the display screen generated by the generating unit according to the present embodiment 1. As illustrated in FIG. 5, a photographed image 20a and a three-dimensional model 20b are disposed in a display screen 20. The photographed image 20a corresponds to a photographed image by the camera 130 and the three-dimensional model 20b corresponds to the three-dimensional model information 160a.

The generating unit 170c causes displayed content 21 indicating the distance to a work target and displayed content 22 indicating the distance to a dangerous range to be displayed in the photographed image 20a. The generating unit 170c may change the color of the displayed content 22 indicating the distance to a dangerous range according to the distance between a hand of the worker and the dangerous range. For example, the generating unit 170c displays red as the color of the displayed content 22 if the distance between the hand of the worker and the dangerous range is shorter than a threshold. The generating unit 170c displays yellow if the distance between the hand of the worker and the dangerous range is equal to or longer than the threshold.

The generating unit 170c adjusts the placement positions of the pieces of displayed content 21 and 22 so that the pieces of displayed content 21 and 22 may be kept from overlapping with the position of the hand of the worker.

The generating unit 170c causes pieces of displayed content 23 and 24 indicating dangerous regions, displayed content 25 indicating the position of the hand of the worker, and displayed content 26 indicating the worker to be displayed in the three-dimensional model 20b. Furthermore, the generating unit 170c may display the dangerous ranges with a given color. Moreover, the generating unit 170c may explicitly indicate the position of the three-dimensional model 20b corresponding to the photographed image 20a. In the example illustrated in FIG. 5, it is indicated that the photographed image 20a is a photographed image corresponding to a region 27 in the three-dimensional model 20b.

Figure 6:
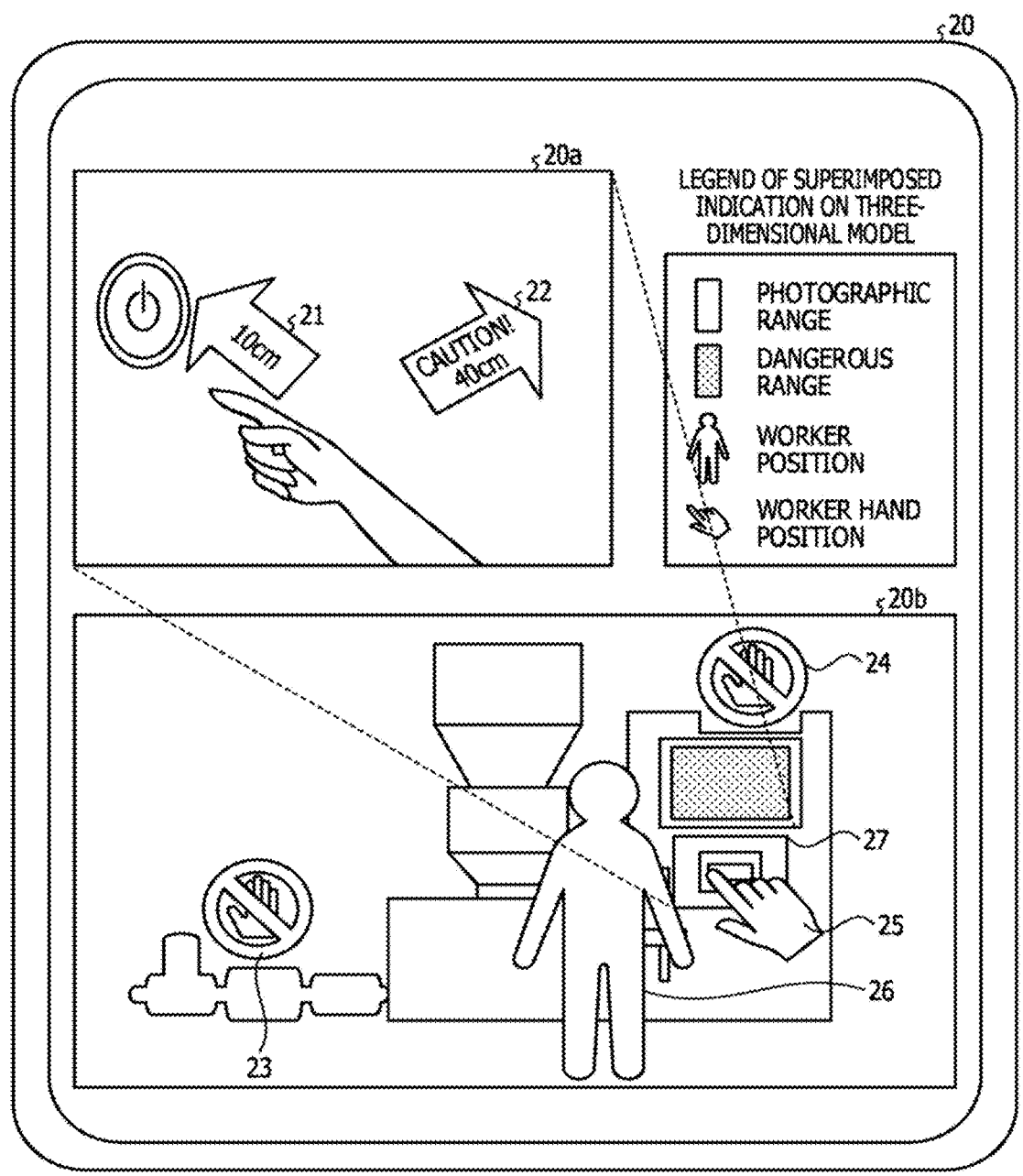
FIG. 6 is diagram (2) illustrating one example of the display screen generated by the generating unit according to the present embodiment 1.

The display screen generated by the generating unit 170c is not limited to the display screen 20 illustrated in FIG. 5. FIG. 6 is diagram (2) illustrating one example of the display screen generated by the generating unit according to the present embodiment 1. For example, the display unit 150 may display only a range corresponding to the photographed image 20a in the three-dimensional model 20b.

The notifying unit 170d is a processing unit that transmits information on the display screen generated by the generating unit 170c to the remote assistance person terminal 200.

Figure 7:
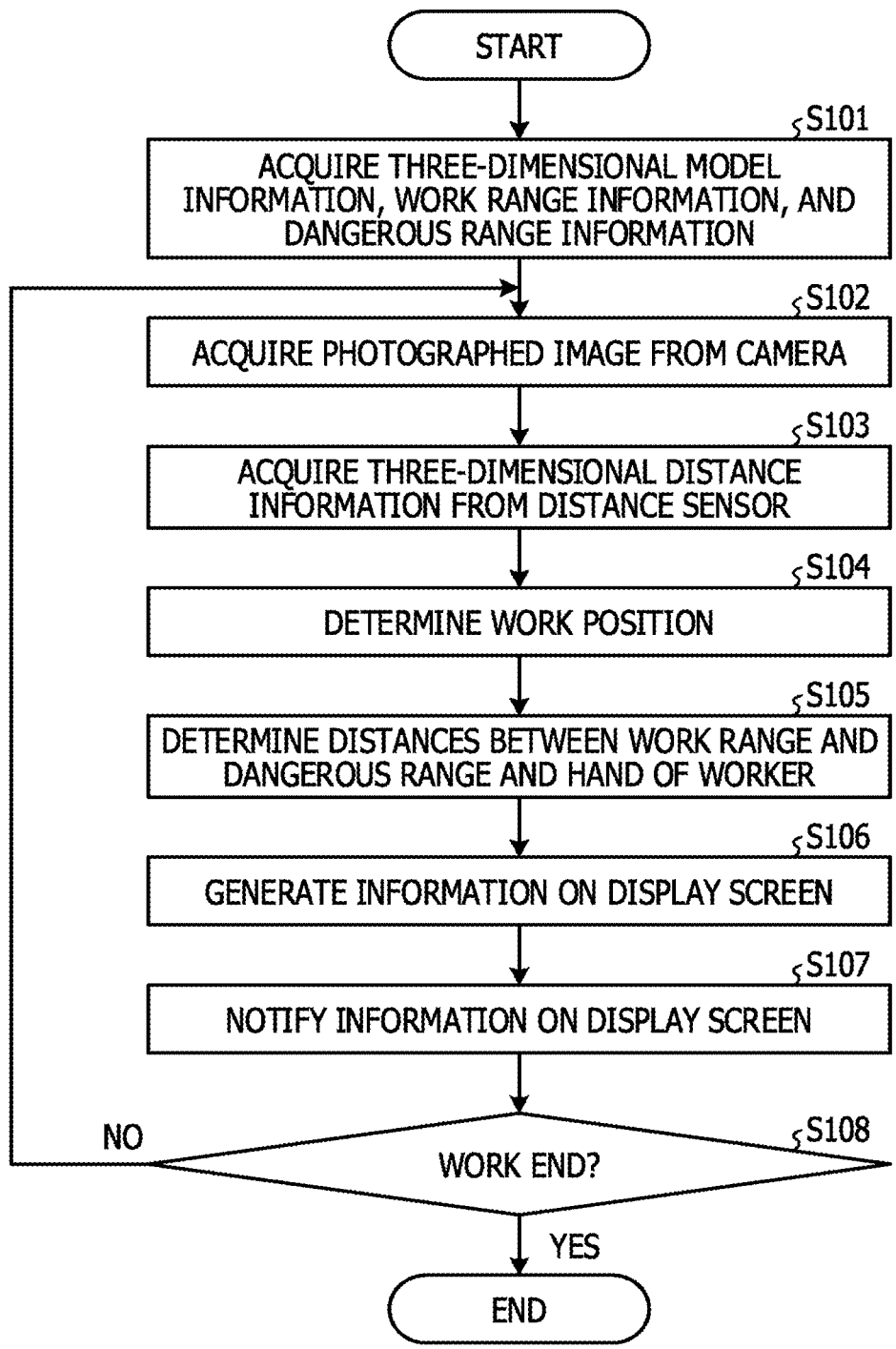
FIG. 7 is a flowchart illustrating a procedure of processing of an image processing device according to the present embodiment 1.

Next, the processing procedure of the image processing device 100 according to the present embodiment 1 will be described. FIG. 7 is a flowchart illustrating a procedure of the processing of the image processing device according to the present embodiment 1. As illustrated in FIG. 7, the acquiring unit 170a of the image processing device 100 acquires the three-dimensional model information 160a, the work range information 160b, and the dangerous range information 160c (step S101).

The acquiring unit 170a acquires a photographed image from the camera 130 (step S102) and acquires three-dimensional distance information from the distance sensor 120 (step S103). The determining unit 170b of the image processing device 100 determines the work position of a worker on the basis of the three-dimensional distance information and the three-dimensional model information 160a (step S104).

The determining unit 170b determines the distances between a work range and a dangerous range and a hand of the worker (step S105). The generating unit 170c of the image processing device 100 generates information on a display screen (step S106) and the notifying unit 170d of the image processing device 100 notifies the remote assistance person terminal 200 of the information on the display screen (step S107).

If the processing is ended (step S108, Yes), the image processing device 100 ends the processing. On the other hand, if the processing is not ended (step S108, No), the image processing device 100 makes transition to the step S102.

Figure 8:
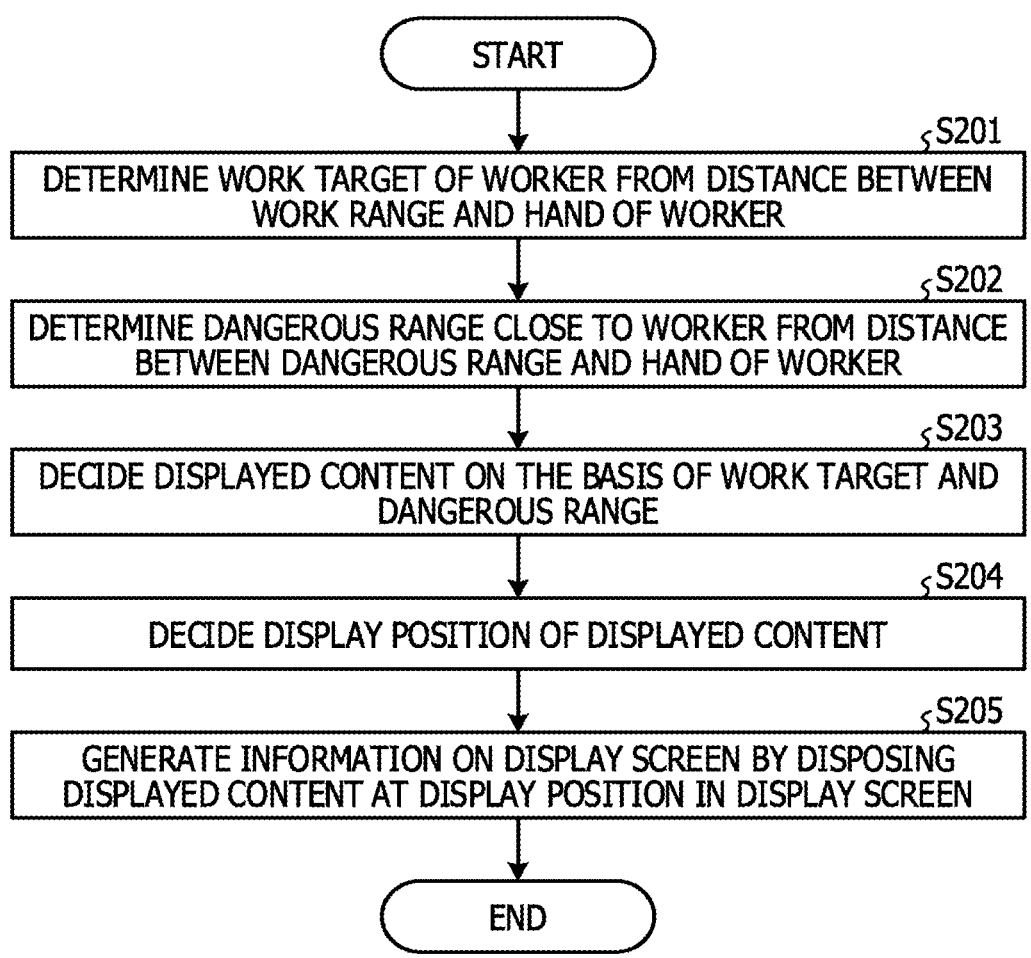
FIG. 8 is a flowchart illustrating a procedure of processing of generating information on a display screen.

Next, one example of the processing of generating the information on the display screen, represented in the step S106 in FIG. 7, will be described. FIG. 8 is a flowchart illustrating a procedure of the processing of generating the information on the display screen. As illustrated in FIG. 8, the determining unit 170b of the image processing device 100 determines a work target from the distance between the work range and the hand of the worker (step S201).

The determining unit 170b determines a dangerous range close to the worker from the distance between the dangerous range and the hand of the worker (step S202). The generating unit 170c of the image processing device 100 decides displayed content on the basis of the work target and the dangerous range (step S203).

The generating unit 170c decides the display position of the displayed content (step S204). The generating unit 170c generates the information on the display screen by disposing the displayed content at the display position in the display screen (step S205).

Figure 9:
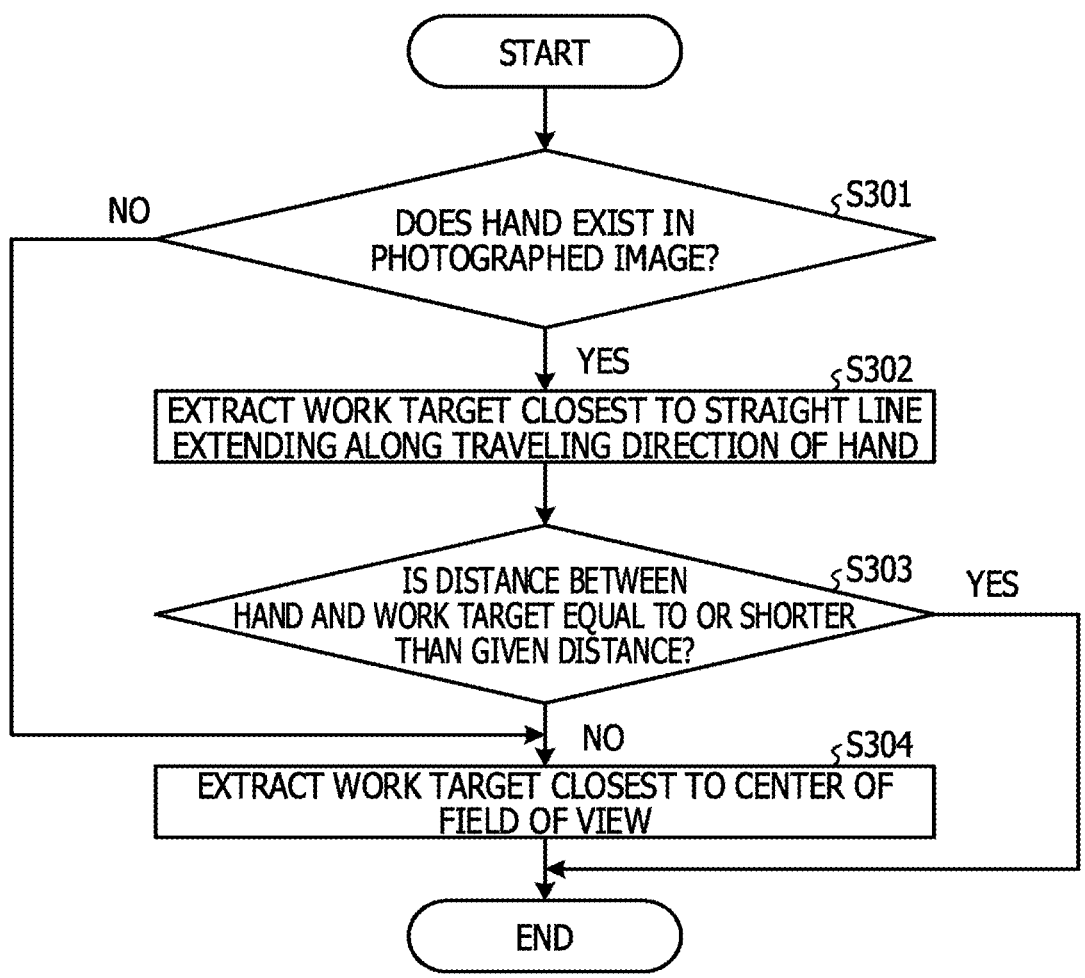
FIG. 9 is a flowchart illustrating a procedure of processing of determining a work target.

Next, one example of the processing of determining the work target, represented in the step S201 in FIG. 8, will be described. FIG. 9 is a flowchart illustrating a procedure of the processing of determining the work target. As illustrated in FIG. 9, the determining unit 170b of the image processing device 100 determines whether or not a hand exists in a photographed image (step S301). If a hand does not exist in the photographed image (step S301, No), the determining unit 170b makes transition to a step S304.

On the other hand, if a hand exists in the photographed image (step S301, Yes), the determining unit 170b extracts the work target closest to the straight line extending along the traveling direction of the hand (step S302). The determining unit 170b determines whether or not the distance between the hand and the work target is equal to or shorter than a given distance (step S303).

If the distance between the hand and the work target is equal to or shorter than the given distance (step S303, Yes), the determining unit 170b ends the processing of determining the work target. For example, if the step S303 results in Yes, the work target extracted in the step S302 is the work target of the determination result.

On the other hand, if the distance between the hand and the work target is not equal to or shorter than the given distance (step S303, No), the determining unit 170b extracts the work target closest to the center of the field of view (step S304). For example, if the step S303 results in No, the work target extracted in the step S304 is the work target of the determination result.

Figure 10:
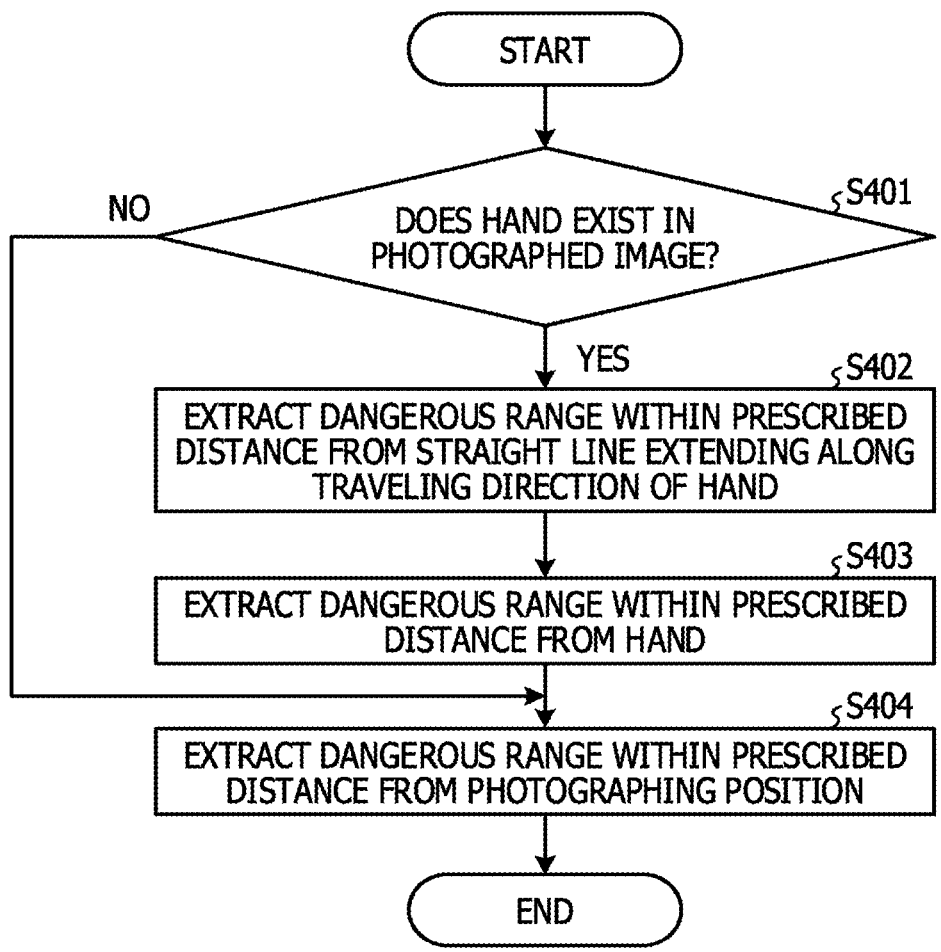
FIG. 10 is a flowchart illustrating a procedure of processing of determining a dangerous range.

Next, one example of the processing of determining the dangerous range, represented in the step S202 in FIG. 8, will be described. FIG. 10 is a flowchart illustrating a procedure of the processing of determining the dangerous range. As illustrated in FIG. 10, the determining unit 170b of the image processing device 100 determines whether or not a hand exists in a photographed image (step S401). If a hand does not exist in the photographed image (step S401, No), the determining unit 170b makes transition to a step S404.

If a hand exists in the photographed image (step S401, Yes), the determining unit 170b extracts a dangerous range within a prescribed distance from the straight line extending along the traveling direction of the hand (step S402).

The determining unit 170b extracts a dangerous range within a prescribed distance from the hand (step S403). The determining unit 170b extracts a dangerous range within a prescribed distance from the photographing position (S404).

Next, effects of the image processing device 100 according to the present embodiment 1 will be described. When transmitting information on a photographed image to the remote assistance person terminal 200, the image processing device 100 determines the work position of the worker from the three-dimensional model information 160a and three-dimensional distance information. The image processing device 100 generates a display screen including information on the direction and distance of a dangerous region or a work region from the work position of the worker and notifies the remote assistance person terminal 200 of the display screen in conjunction with the information on the photographed image. Thus, not only the position of the worker but also the distance to the dangerous range or the work range that has an influence on the worker can be displayed and the remote assistance person can easily grasp the situation of the worker at the work site.

Embodiment 2

The processing of the image processing device 100 represented in embodiment 1 is one example. In the present embodiment 2, another kind of processing executed by the image processing device 100 will be described.

Another kind of processing (1) of the generating unit 170c will be described. In the case of generating a display screen by disposing a photographed image and a three-dimensional model, the generating unit 170c adjusts the placement position of the photographed image according to the position of a worker on the three-dimensional model. For example, the generating unit 170c adjusts the position of the photographed image in such a manner that the position of the worker in the horizontal direction on the three-dimensional model 20b overlaps with the position of the photographed image in the horizontal direction. The generating unit 170c may use the position of the point of view of the worker instead of the position of the worker.

FIG. 11 is a diagram for explaining another kind of processing (1) of the generating unit. In FIG. 11, display screens 20A and 20B are illustrated as one example. A description will be made about the display screen 20A. In the display screen 20A, the worker 26 is located on the left side of the three-dimensional model 20b and the photographed image 20a corresponds to a region 27a. In this case, the generating unit 170c disposes the photographed image 20a on the left side of the display screen 20A so that the position of the photographed image 20a in the horizontal direction may overlap with the position of the worker 26 in the horizontal direction.

A description will be made about the display screen 20B. In the display screen 20B, the worker 26 is located on the right side of the three-dimensional model 20b and the photographed image 20a corresponds to a region 27b. In this case, the generating unit 170c disposes the photographed image 20a on the right side of the display screen 20B so that the position of the photographed image 20a in the horizontal direction may overlap with the position of the worker 26 in the horizontal direction.

Figure 12:
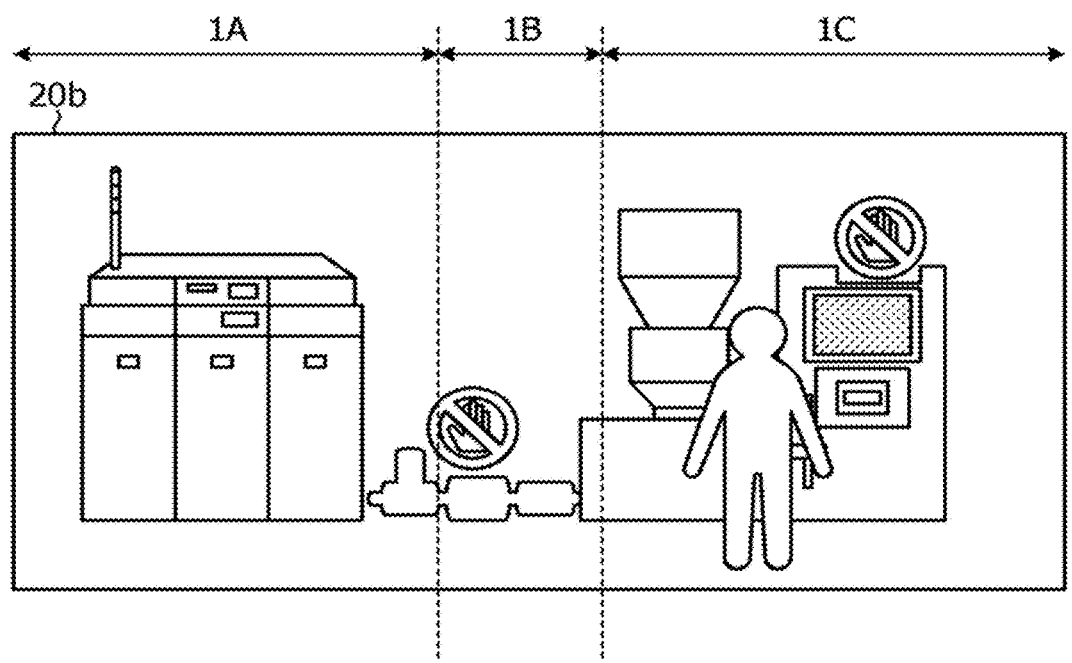
FIG. 12 is a diagram for explaining processing of adjusting a placement position of a photographed image.

Here, an example of the processing of adjusting the placement position of the photographed image by the generating unit 170c will be described. FIG. 12 is a diagram for explaining the processing of adjusting the placement position of the photographed image. As illustrated in FIG. 12, the generating unit 170c divides the three-dimensional model 20b into a left region 1A, a central region 1B, and a right region 1C. If the position of the worker is included in the left region 1A, the generating unit 170c disposes the photographed image 20a on the left side as illustrated in the display screen 20A in FIG. 11.

If the position of the worker is included in the central region 1B, the generating unit 170c does not adjust the position of the photographed image 20a and keeps the unchanged placement position. If the position of the worker is included in the right region 1C, the generating unit 170c disposes the photographed image 20a on the right side as illustrated in the display screen 20B in FIG. 11.

Figure 13:
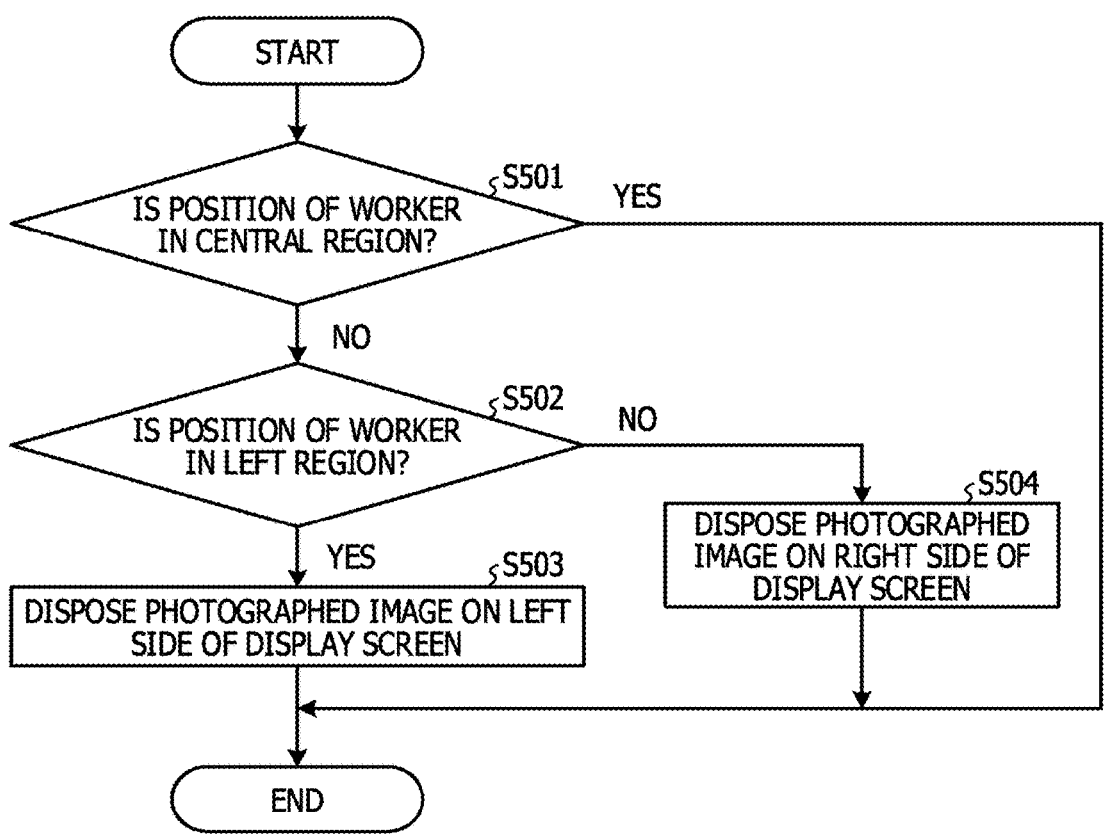
FIG. 13 is a flowchart illustrating a processing procedure of another kind of processing (1) of the generating unit.

FIG. 13 is a flowchart illustrating a processing procedure of another kind of processing (1) of the generating unit. With FIG. 13, a description will be made by using the position of the worker as one example. However, the position of the point of view of the worker may be used instead of the position of the worker.

As illustrated in FIG. 13, the generating unit 170c determines whether or not the position of the worker is in the central region of a three-dimensional model (step S501). If the position of the worker is in the central region of the three-dimensional model (step S501, Yes), the generating unit 170c ends the processing.

If the position of the worker is not in the central region of the three-dimensional model (step S501, No), the generating unit 170c determines whether or not the position of the worker is in the left region of the three-dimensional model (step S502). If the position of the worker is in the left region of the three-dimensional model (step S502, Yes), the generating unit 170c disposes a photographed image on the left side of a display screen (step S503).

On the other hand, if the position of the worker is in the right region of the three-dimensional model (step S502, No), the generating unit 170c disposes the photographed image on the right side of the display screen (step S504).

The generation of the display screen in the above-described manner by the generating unit 170c can suppress the amount of movement of the line of sight when a remote assistance person views the worker on the three-dimensional model 20b and the photographed image 20a. Furthermore, setting the central region 1B in the three-dimensional model 20b can inhibit the placement position of the photographed image 20a from being frequently changed.

Next, another kind of processing (2) of the generating unit 170c will be described. In the case of disposing a three-dimensional model on a display screen, the generating unit 170c may display only a peripheral range based on the position of the worker instead of displaying the whole range of the three-dimensional model. In the following description, the region of the peripheral range based on the position of the worker will be represented as the peripheral region.

The generating unit 170c sets a peripheral region having a size set in advance in a three-dimensional model and determines whether or not a dangerous range or a work range is included in the peripheral region. If a dangerous range or a work range is not included in the peripheral region, the generating unit 170c reduces the peripheral region to the minimum display range defined in advance. The generating unit 170c clips the three-dimensional model by the minimum display range and disposes the clipped three-dimensional model in a display screen.

On the other hand, if a dangerous range or a work range is included in the peripheral region, the generating unit 170c reduces and adjusts the range of the peripheral region within a range in which the dangerous range or the work range is not erased. The generating unit 170c clips the three-dimensional model by the adjusted peripheral region and disposes the clipped three-dimensional model in the display screen.

Figure 14:
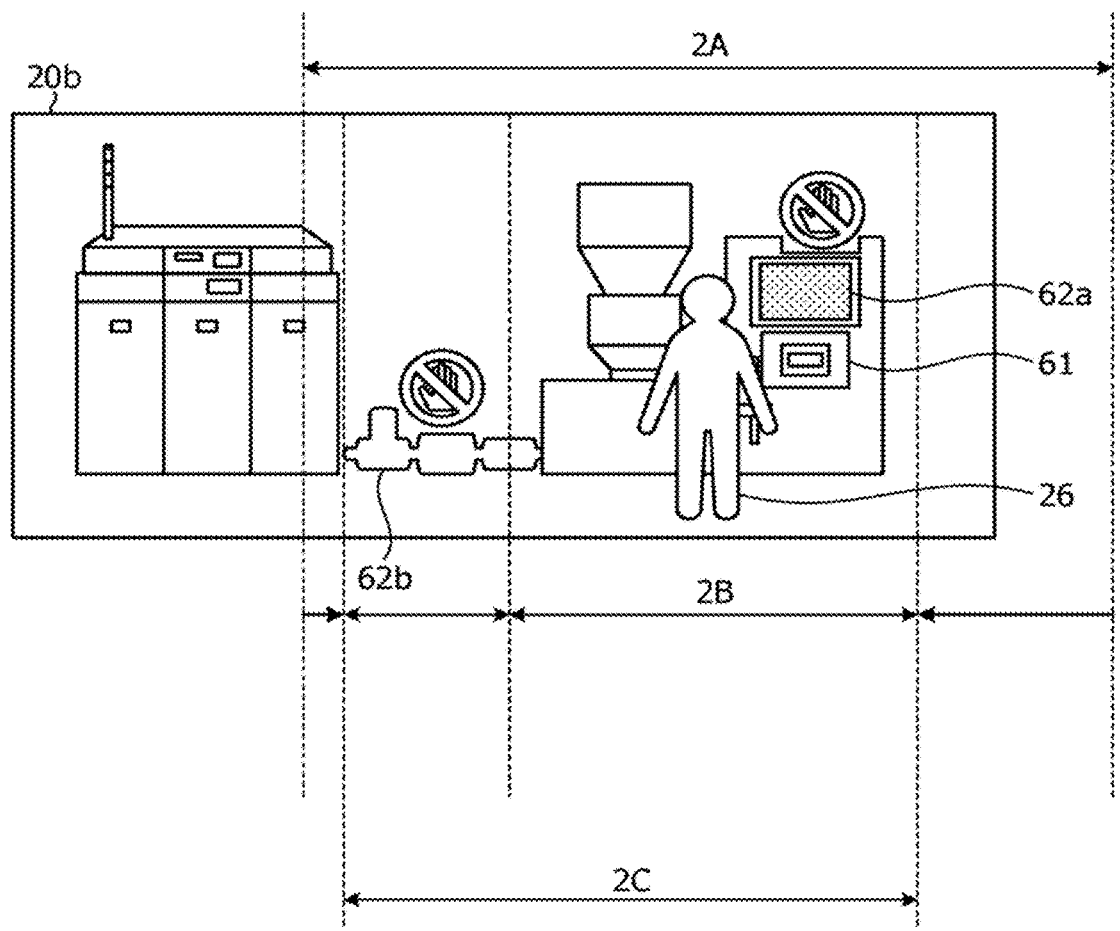
FIG. 14 is a diagram for explaining another kind of processing (2) of the generating unit.

FIG. 14 is a diagram for explaining another kind of processing (2) of the generating unit. In FIG. 14, the generating unit 170c sets a peripheral region based on the position of the worker 26 in the three-dimensional model 20b and defines the range of the peripheral region as a range 2A. The dangerous regions 62a and 62b and the work region 61 are included in the range 2A. Therefore, the generating unit 170c reduces and adjusts the range of the peripheral region within a range in which the dangerous ranges 62a and 62b and the work range 61 are not erased. The range of the peripheral region after the adjustment is a range 2C. The generating unit 170c clips the peripheral region of the range 2C in the three-dimensional model 20b and disposes the clipped peripheral region in the display screen.

If a dangerous region and a work range are not included in the range 2A, the generating unit 170c reduces the range of the peripheral region to a minimum display range 2B and clips the three-dimensional model by the minimum display range 2B to dispose the clipped three-dimensional model in the display screen.

Figure 15:
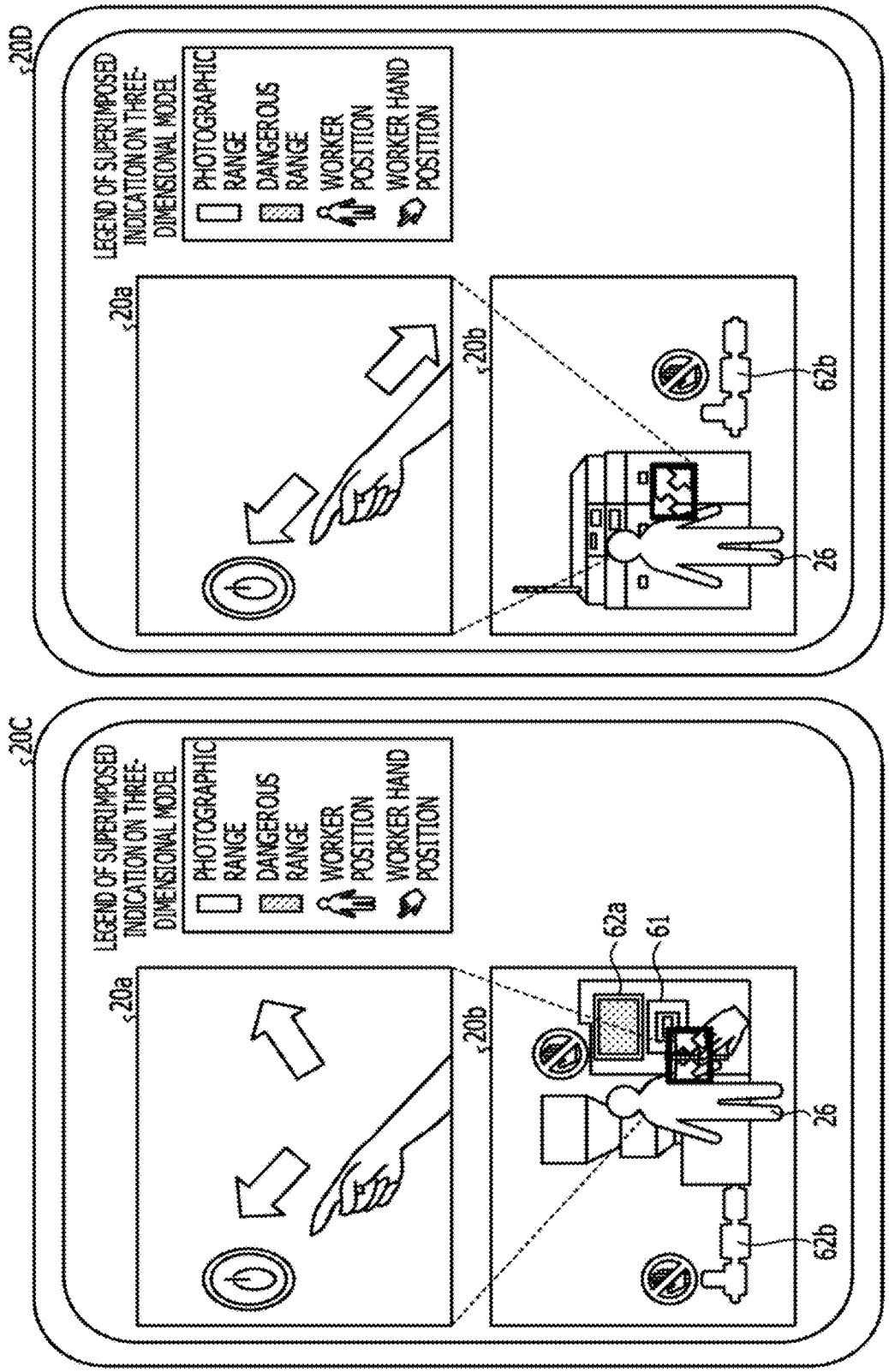
FIG. 15 is diagram (1) illustrating one example of a display screen generated by a generating unit according to present embodiment 2.

FIG. 15 is diagram (1) illustrating one example of a display screen generated by the generating unit according to the present embodiment 2. In FIG. 15, display screens 20C and 20D are illustrated as one example. In the display screen 20C, the photographed image 20a and the three-dimensional model 20b are disposed. Furthermore, the range of a peripheral region based on the position of the worker 26 is clipped as the three-dimensional model 20b. The work target 61 and the dangerous ranges 62a and 62b are included in the three-dimensional model 20b of the display screen 20C.

In the display screen 20D, the photographed image 20a and the three-dimensional model 20b are disposed. Furthermore, the range of a peripheral region based on the position of the worker 26 is clipped as the three-dimensional model 20b. The dangerous range 62b is included in the three-dimensional model 20b of the display screen 20D.

Figure 16:
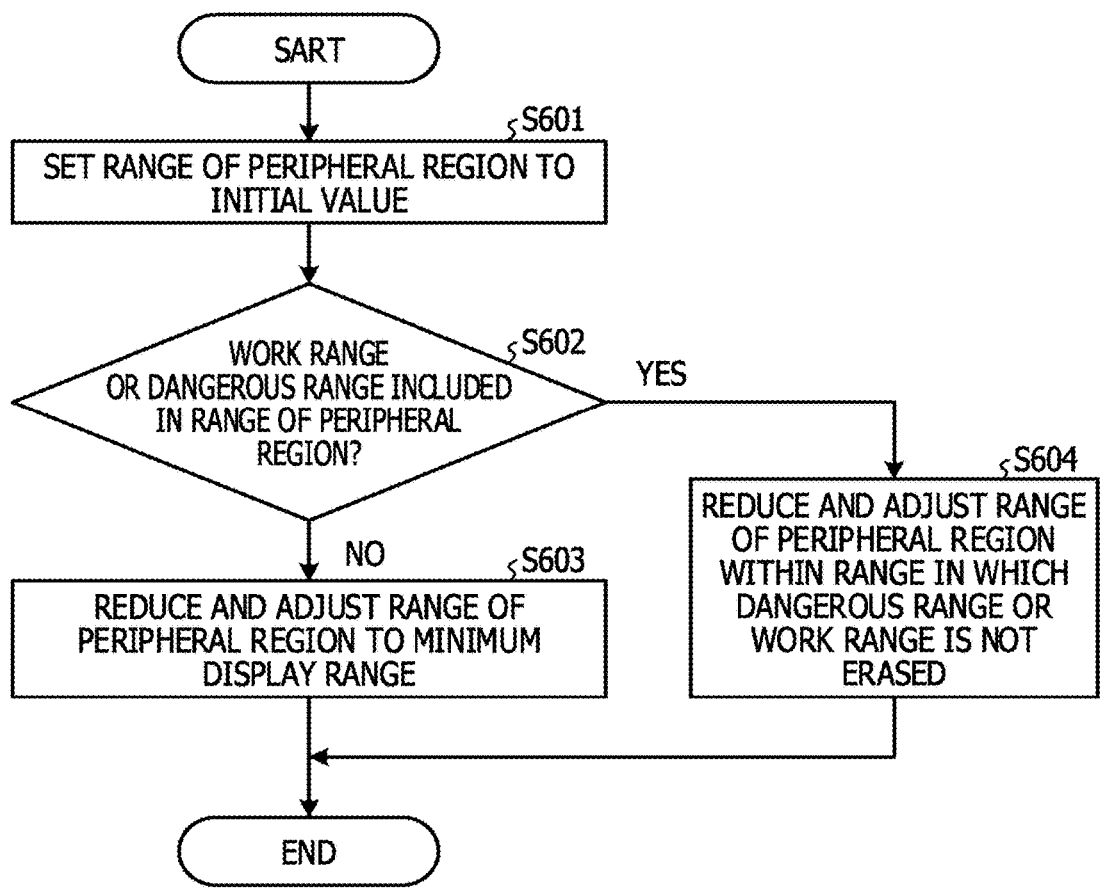
FIG. 16 is a flowchart illustrating a processing procedure of another kind of processing (2) of the generating unit.

FIG. 16 is a flowchart illustrating a processing procedure of another kind of processing (2) of the generating unit. As illustrated in FIG. 16, the generating unit 170c sets the range of the peripheral region to an initial value (step S601). The generating unit 170c determines whether or not a work range or a dangerous range is included in the range of the peripheral region (step S602).

If a work range or a dangerous range is not included in the range of the peripheral region (step S602, No), the generating unit 170c reduces and adjusts the range of the peripheral region to the minimum display range (step S603).

On the other hand, if a work range or a dangerous range is included in the range of the peripheral region (step S602, Yes), the generating unit 170c reduces and adjusts the range of the peripheral region within a range in which the dangerous range or the work range is not erased (step S604).

In the above-described manner, the generating unit 170c clips the range of the peripheral region from the three-dimensional model and displays the clipped range. This can narrow down the range to which a remote assistance person may pay attention and can alleviate the burden of the remote assistance person.

Incidentally, the generating unit 170c may adjust the range of the peripheral region in any manner. For example, the generating unit 170c employs the minimum display range as the initial value of the peripheral region and determines whether or not the boundary of the peripheral region overlaps with a dangerous region or a work region. If the boundary of the peripheral region does not overlap with a dangerous region or a work region, the generating unit 170c employs the minimum display range as the peripheral region. On the other hand, if the boundary of the peripheral region overlaps with a dangerous region or a work region, the generating unit 170c extends and adjusts the range of the peripheral region until the peripheral region contains the dangerous region or the work region.

Next, another kind of processing (3) of the generating unit 170c will be described. If the distance between a hand of the worker and a work target becomes shorter than a threshold, the generating unit 170c may generate a virtual image of the case in which the work target is viewed from a different point of view from the point of view of the worker by utilizing the three-dimensional model information 160a, and display the image on a display screen. In the following description, the virtual image of the case in which a work target is viewed from a different point of view from the point of view of the worker will be represented as the another-point-of-view image.

Figure 17:
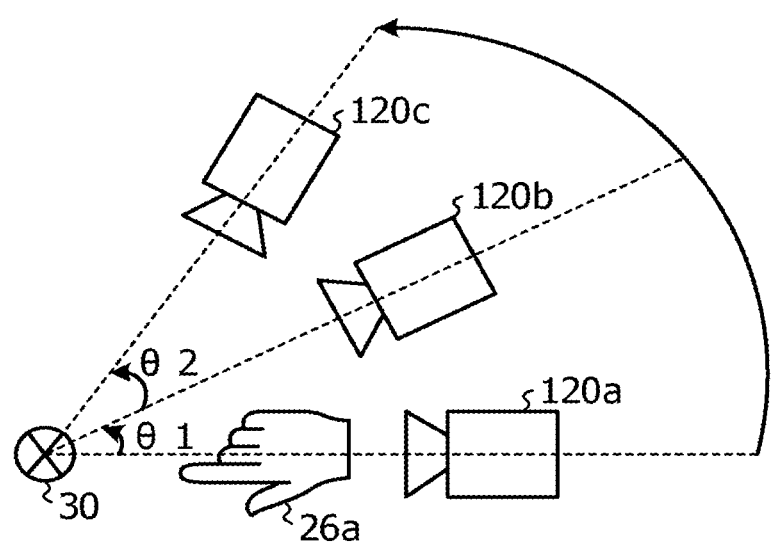
FIG. 17 is a diagram for explaining another kind of processing (3) of the generating unit.

FIG. 17 is a diagram for explaining another kind of processing (3) of the generating unit. The generating unit 170c virtually rotates the position of the point of view of the distance sensor 120 as the distance between the position of a hand 26a of the worker and a work target 30 becomes shorter, and the generating unit 170c generates an another-point-of-view image of the case in which the work target 30 is viewed from the virtual position of the point of view resulting from the rotation.

For example, if the distance between the hand 26a of the worker and the work target 30 becomes shorter than a first threshold, the generating unit 170c rotates the camera by θ1, with the straight line linking the hand 26a of the worker and the work target 30 being the axis, and generates an another-point-of-view image of the case in which the work target 30 is viewed from a position 120b of the point of view. Furthermore, if the distance between the hand 26a of the worker and the work target 30 becomes shorter than a second threshold, the generating unit 170c further rotates the camera by θ2 around the axis and generates an another-point-of-view image of the case in which the work target 30 is viewed from a position 120c of the point of view.

The generating unit 170c may determine the angle of the rotation by using not only the distance between a hand of the user and a work target but also the distance between the hand of the worker and a dangerous range. For example, the generating unit 170c determines the angle of the rotation by using a rotation amount table.

FIG. 18 is a diagram illustrating one example of a data structure of the rotation amount table. As illustrated in FIG. 18, this rotation amount table associates a distance d1, a distance d2, and an angle θ. The distance d1 indicates the distance between a hand of the worker and a dangerous range. The distance d2 indicates the distance between the hand of the worker and a work target. The angle θ indicates the rotation angle around the axis linking the hand of the worker and the work target.

Figure 19:
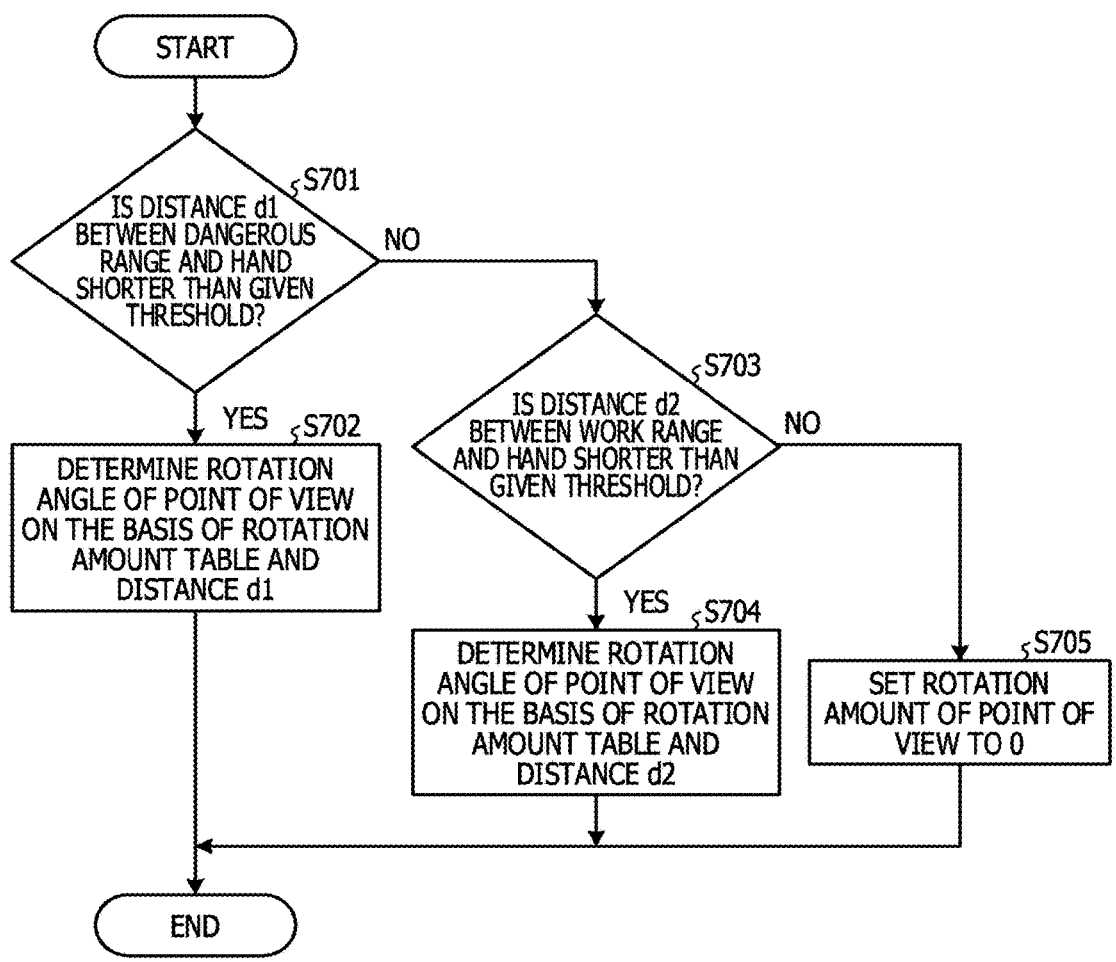
FIG. 19 is a flowchart illustrating a processing procedure of another kind of processing (3) of the generating unit.

For example, the generating unit 170c determines the angle of the rotation on the basis of a processing procedure illustrated in FIG. 19 and the rotation amount table. FIG. 19 is a flowchart illustrating a processing procedure of another kind of processing (3) of the generating unit. As illustrated in FIG. 19, the generating unit 170c determines whether or not the distance d1 between the dangerous range and the hand is shorter than a given threshold (step S701). If the distance d1 between the dangerous range and the hand is shorter than the given threshold (step S701, Yes), the generating unit 170c determines the rotation angle of the point of view on the basis of the rotation amount table and the distance d1 (step S702). For example, if the distance d1 is equal to or shorter than 1 cm in the step S702, the rotation angle is "90 deg."

On the other hand, if the distance d1 between the dangerous range and the hand is not shorter than the given threshold (step S701, No), the generating unit 170c determines whether or not the distance d2 between the work range and the hand is shorter than a given threshold (step S703). If the distance d2 between the work range and the hand is shorter than the given threshold (step S703, Yes), the generating unit 170c determines the rotation angle of the point of view on the basis of the rotation amount table and the distance d2 (step S704). For example, if the distance d2 is 30 cm in the step S704, the rotation angle is "45 deg."

On the other hand, if the distance d2 between the work range and the hand is not shorter than the given threshold (step S703, No), the generating unit 170c sets the rotation amount of the point of view to 0 (step S705).

The generating unit 170c may generate the another-point-of-view image in any manner. For example, the generating unit 170c converts three-dimensional distance information from the distance sensor 120 to three-dimensional distance information of the virtual position of the point of view based on the rotation angle decided by the processing based on FIG. 19. Then, the generating unit 170c generates an another-point-of-view image on the basis of the three-dimensional distance information of the virtual position of the point of view and the three-dimensional model information 160a. If the rotation angle around the axis is equal to or larger than a threshold, the generating unit 170c may synthesize the three-dimensional model information 160a and an image of the hand to carry out conversion to an image as viewed from the virtual position of the point of view.

Figure 20:
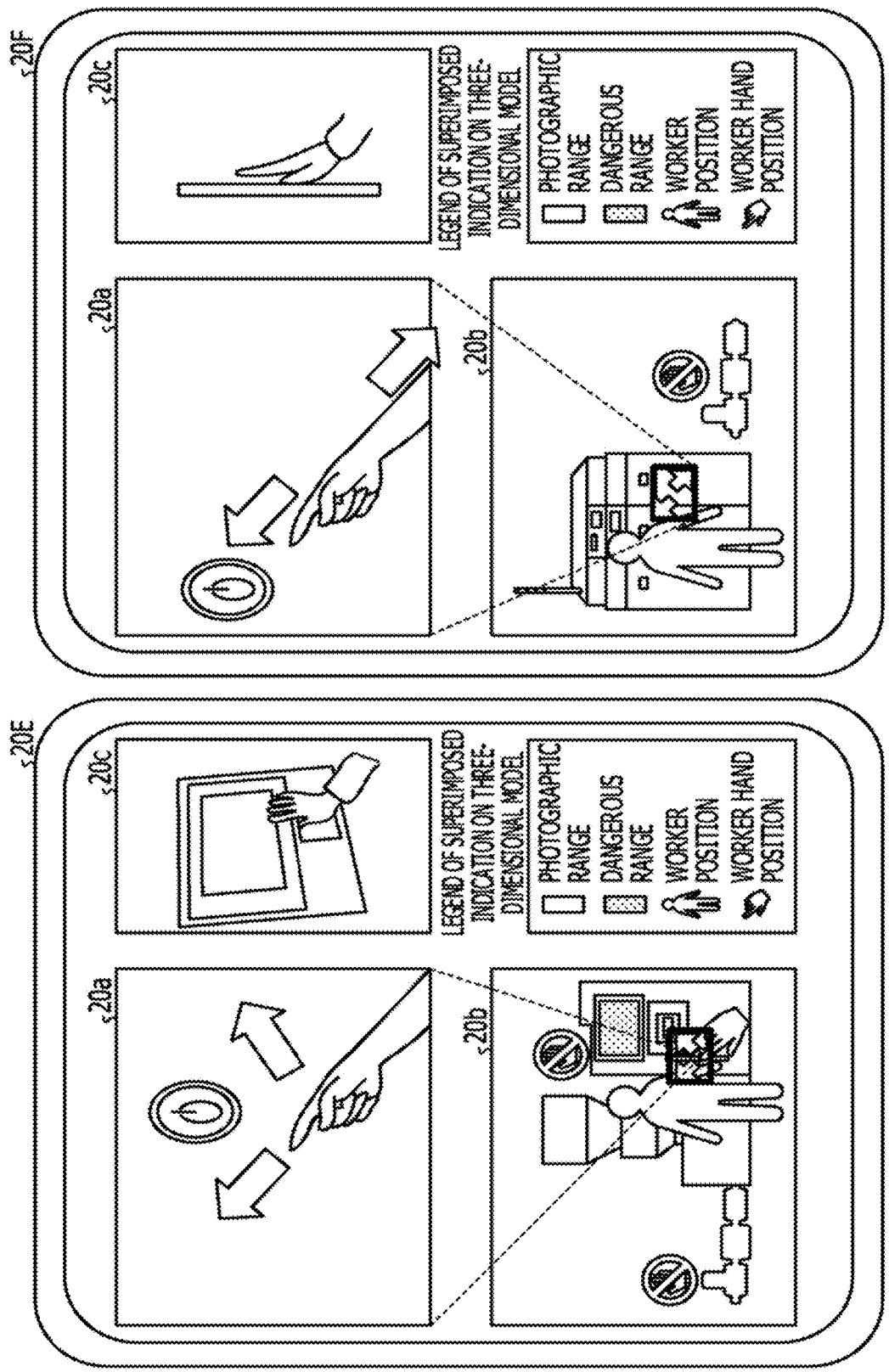
FIG. 20 is diagram (2) illustrating one example of the display screen generated by the generating unit according to the present embodiment 2.

FIG. 20 is diagram (2) illustrating one example of the display screen generated by the generating unit according to the present embodiment 2. In FIG. 20, display screens 20E and 20F are illustrated as one example. In the display screen 20E, the photographed image 20a, the three-dimensional model 20b, and an another-point-of-view image 20c are disposed. For example, the another-point-of-view image 20c of the display screen 20E is an another-point-of-view image when the point of view is rotated by θ1 around the axis.

In the display screen 20F, the photographed image 20a, the three-dimensional model 20b, and the another-point-of-view image 20c are disposed. For example, the another-point-of-view image 20c of the display screen 20F is an another-point-of-view image when the point of view is rotated by θ1+θ2 around the axis.

Due to the execution of the above-described processing, even when it is difficult to grasp a sense of distance from a photographed image by the camera 130, the remote assistance person can easily grasp the distance between the worker and the dangerous range or the distance between the worker and the work range through generation of an another-point-of-view image and notification of the another-point-of-view image to the remote assistance person.

Figure 21:
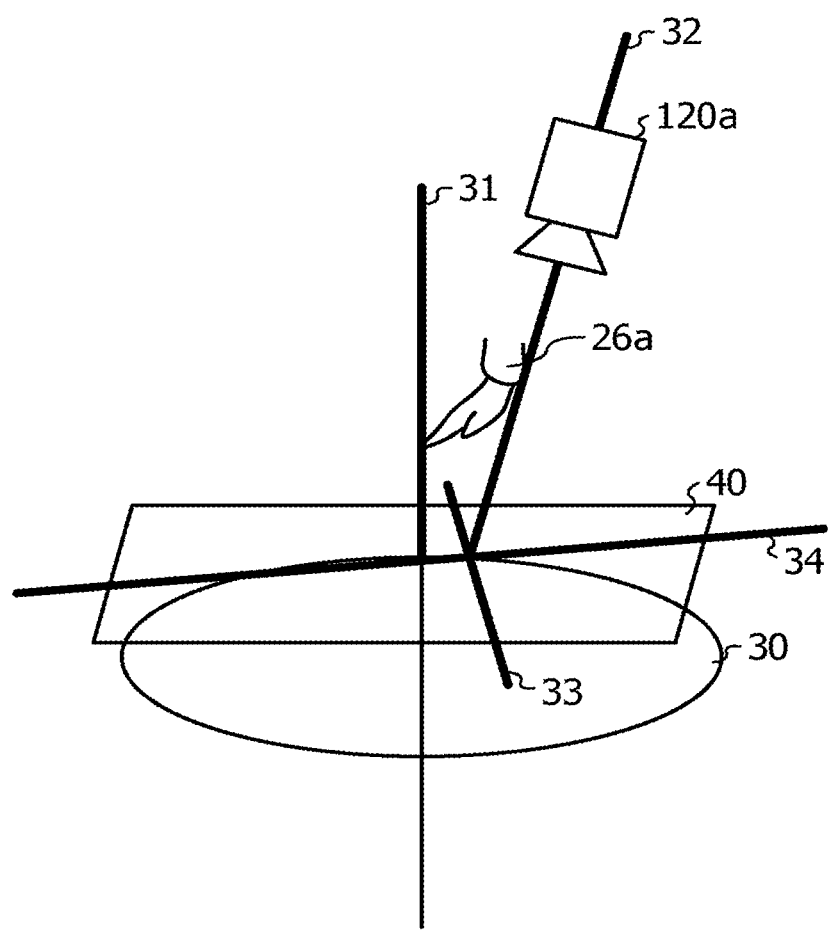
FIG. 21 is a diagram for explaining one example of another rotation axis.

Incidentally, the rotation axis of the point of view may be other than the straight line linking the hand 26a of the worker and the work target 30 like that illustrated in FIG. 17. FIG. 21 is a diagram for explaining one example of another rotation axis. In FIG. 21, the straight line linking a hand and a work target is defined as a straight line 31 and the straight line corresponding to the line of sight of the camera 130 is defined as a straight line 32. A tangent plane to the work target 30 at the intersection of the straight line 31 and the work target 30 is defined as a plane 40. A straight line that intersects the straight line 32 at a right angle on the plane 40 is defined as a straight line 33. Here, a straight line 34 that intersects the straight line 32 and the straight line 33 at a right angle on the plane 40 may be employed as the rotation axis. The plane 40 may be not a tangent plane but a plane that intersects the straight line 31 at a right angle.

Furthermore, although the generating unit 170c determines the rotation angle on the basis of the rotation amount table illustrated in FIG. 18, the configuration is not limited thereto. For example, the generating unit 170c may pay attention to the point at which the straight line linking a hand and a work target intersects the work target and determine an angle with which the point to which the attention is paid is not hidden by the hand as the rotation angle. Furthermore, if the distance between a hand and a work target becomes shorter than a threshold, the generating unit 170c may set the rotation angle to 90 degrees across the board.

Figure 22:
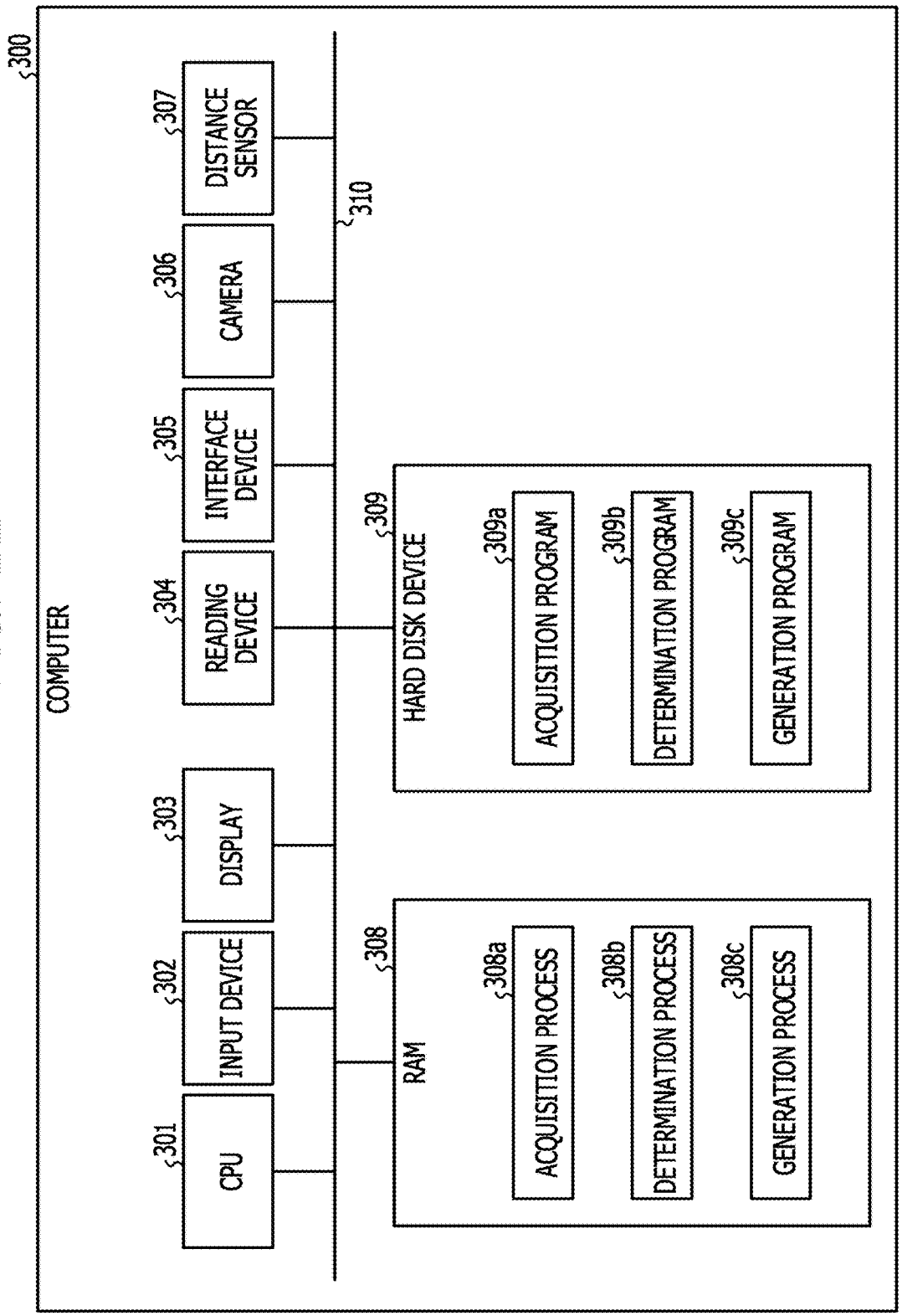
FIG. 22 is a diagram illustrating one example of a computer that executes an image processing program.
Figure 23:
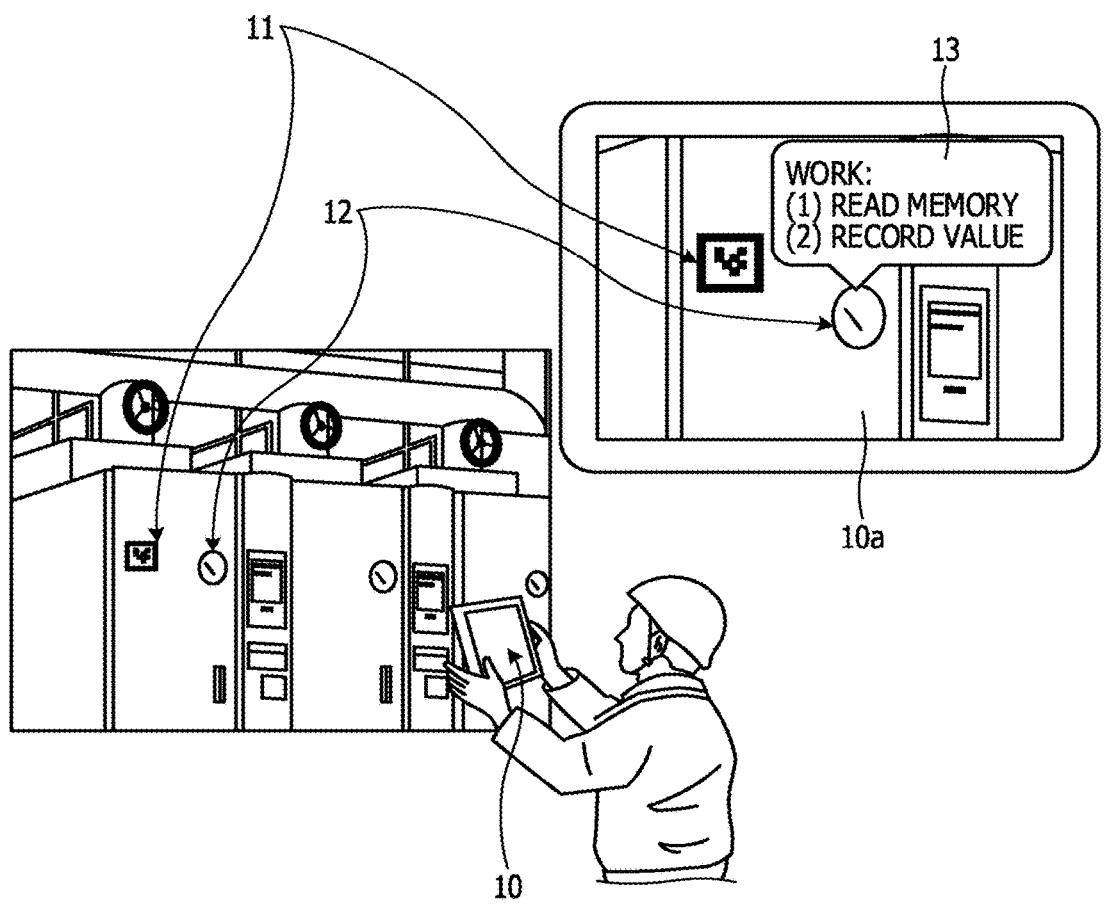
FIG. 23 is a diagram illustrating one example of an AR technique.

Next, a description will be made about one example of a computer that executes an image processing program that implements functions similar to those of the image processing device 100 represented in the above-described embodiments 1 and 2. FIG. 22 is a diagram illustrating one example of the computer that executes the image processing program.

As illustrated in FIG. 22, a computer 300 includes a CPU 301 that executes various kinds of arithmetic processing, an input device 302 that accepts input of data from a user, and a display 303. Furthermore, the computer 300 includes a reading device 304 that reads a program and so forth from a storage medium, an interface device 305 that gives and receives data to and from another computer via a network, a camera 306, and a distance sensor 307. Moreover, the computer 300 includes a RAM 308 that temporarily stores various kinds of information and a hard disk device 309. In addition, the respective devices 301 to 309 are coupled to a bus 310.

The hard disk device 309 includes an acquisition program 309a, a determination program 309b, and a generation program 309c. The CPU 301 reads out the acquisition program 309a, the determination program 309b, and the generation program 309c and loads the programs into the RAM 308.

The acquisition program 309a functions as an acquisition process 308a. The determination program 309b functions as a determination process 308b. The generation program 309c functions as a generation process 308c.

Processing of the acquisition process 308a corresponds to the processing of the acquiring unit 170a. Processing of the determination process 308b corresponds to the processing of the determining unit 170b. Processing of the generation process 308c corresponds to the processing of the generating unit 170c.

The acquisition program 309a, the determination program 309b, and the generation program 309c do not necessarily need to be stored in the hard disk device 309 from the beginning. For example, the respective programs are stored in a "portable physical medium" such as flexible disc (FD), compact disc read-only memory (CD-ROM), digital versatile disc (DVD), magneto-optical disc, or integrated circuit (IC) card inserted into the computer 300. Then, the computer 300 may read out and execute the respective programs 309a to 309c.

Incidentally, in the above-described embodiments 1 and 2, the case in which the image processing device 100 includes the acquiring unit 170a, the determining unit 170b, the generating unit 170c, and the notifying unit 170d is described. However, the configuration is not limited thereto. For example, the remote assistance person terminal 200 may execute part of the processing of the image processing device 100, and the image processing device 100 and the remote assistance person terminal 200 may cooperate to generate the above-described display screen and display the display screen on the remote assistance person terminal 200. For example, the image processing device 100 may include the acquiring unit 170a and the remote assistance person terminal 200 may include the determining unit 170b and the generating unit 170c. In this case, the image processing device 100 notifies the remote assistance person terminal 200 of information acquired from the distance sensor 120 and the camera 130 and the remote assistance person terminal 200 generates the display screen by using the notified information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing method, comprising:
    acquiring, by a sensor held by a user, a three-dimensional model of a plurality of objects included in a workspace by modeling the plurality of objects included in the workspace;
    acquiring, by a camera held by a user, an image captured by the camera, the user existing in the workspace;
    acquiring, by the sensor, distance information indicating distances between the sensor and each of the plurality of objects;
    determining a hand region of the user in the workspace based on the three-dimensional model and the distance information;
    identifying a dangerous region closest to the hand region of the user among at least one of predetermined dangerous regions defined in the three-dimensional model;
    identifying a work target closest to the hand region of the user among at least one of predetermined work targets defined in the three-dimensional model;
    generating a display screen displaying the image overlapped with a content corresponding to the identified dangerous region and a content corresponding to the work target; and
    outputting the display screen to a computing device associated with a person other than the user.

2. The image processing method according to claim 1, further comprising:
    identifying a hand region of the user based on the distance information and the three-dimensional model; and
    identifying an object to become the work target for the user among the plurality of objects defined in the three-dimensional model based on the hand region.

3. The image processing method according to claim 2, further comprising:
    determining a first direction and a first distance from the hand region of the user to the dangerous region based on the at least one of dangerous regions; and
    determining a second direction and a second distance from the hand region of the user to the work region corresponding to the object to become the work target in the three-dimensional model based on the work region.

4. The image processing method according to claim 3, wherein the display screen includes the first direction, the first distance, the second direction, and the second distance.

5. The image processing method according to claim 4, further comprising:
    setting a specific region on the three-dimensional model, the specific region including the hand region of the user;
    determining whether or not a boundary of the specific region overlaps with at least one of the dangerous region and the work region;
    extending the specific region until the specific region contains at least one of the dangerous region and the work region when the boundary of the specific region overlaps with at least one of the dangerous region and the work region; and
    displaying extended specific region in the display screen.

6. The image processing method according to claim 3, further comprising:
    generating a virtual image of a case in which the work region is photographed from a view point position resulting from virtual rotation of another view point position of the camera based on a distance between the hand region of the user and the work region; and
    displaying the virtual image in the display screen.

7. The image processing method according to claim 1, further comprising:
    determining a horizontal direction on the three-dimensional model with respect to the user; and
    displaying the three-dimensional model and the image in the display screen in such a manner that a horizontal direction on the image corresponds to a horizontal position on the three-dimensional model.

8. The image processing method according to claim 1, wherein the camera is mounted on a head mounted display.

9. The image processing method according to claim 1, wherein
    the sensor is a ranging sensor, and
    the distance information is a distance image.

10. The image processing method according to claim 1, wherein the computing device remotely instructs the user to carry out a work.

11. An image processing device, comprising:
    a memory; and
    a processor coupled to the memory and configured to:
    acquire, from a sensor held by a user, a three-dimensional model of a plurality of objects included in a workspace, the sensor modeling the plurality of objects included in the workspace;
    acquire, from a camera held by a user, an image captured by the camera, the user existing in the workspace;
    acquire, from the sensor, distance information indicating distances between the sensor and each of the plurality of objects;
    determine a hand region of the user in the workspace based on the three-dimensional model and the distance information;
    identify a dangerous region closest to the hand region of the user among at least one of dangerous regions defined in the three-dimensional model;

identify a work target closest to the hand region of the user among at least one of predetermined work targets defined in the three-dimensional model;

generate a display screen displaying the image overlapped with a content corresponding to the identified dangerous region and a content corresponding to the work target; and output the display screen to another computer associated with a person other than the user.

12. The image processing device according to claim 11, wherein the processor is configured to:

identify a hand region of the user based on the distance information and the three-dimensional model, and identify an object to become the work target for the user among the plurality of objects defined in the three-dimensional model based on the hand region.

13. The image processing device according to claim 12, wherein the processor is configured to:

determine a first direction and a first distance from the hand region of the user to the dangerous region based on the at least one of dangerous regions, and determine a second direction and a second distance from the hand region of the user to the work region corresponding to the object to become the work target in the three-dimensional model based on the work region.

14. The image processing device according to claim 13, wherein the display screen includes the first direction, the first distance, the second direction, and the second distance.

15. The image processing device according to claim 14, wherein the processor is configured to:

set a specific region on the three-dimensional model, the specific region including the hand region of the user, determine whether or not a boundary of the specific region overlaps with at least one of the dangerous region and the work region, extend the specific region until the specific region contains at least one of the dangerous region and the work region when the boundary of the specific region overlaps with at least one of the dangerous region and the work region, and display extended specific region in the display screen.

16. The image processing device according to claim 11, wherein the processor is configured to:

determine a horizontal direction on the three-dimensional model with respect to the user, and display the three-dimensional model and the image in the display screen in such a manner that a horizontal direction on the image corresponds to a horizontal position on the three-dimensional model.

17. The image processing device according to claim 11, wherein the camera is mounted on a head mounted display.

18. The image processing device according to claim 11, wherein the sensor is a ranging sensor, and the distance information is a distance image.

19. The image processing device according to claim 11, wherein the computing device remotely transmits instructions to the user to carry out a work.

20. A non-transitory computer-readable storage medium storing a program for causing a computer to executed an image processing process, the image processing process comprising:

acquiring, from a sensor held by a user, a three-dimensional model of a plurality of objects included in a workspace, the sensor modeling the plurality of objects included in the workspace;

acquiring, from a camera held by a user, an image captured by the camera, the user existing in the workspace;

acquiring, from the sensor, distance information indicating distances between the sensor and each of the plurality of objects;

determining a hand region of the user in the workspace based on the three-dimensional model and the distance information;

identifying a dangerous region closest to the hand region position of the user among at least one of dangerous regions defined in the three-dimensional model;

identifying a work target closest to the hand region of the user among at least one of predetermined work targets defined in the three-dimensional model;

generating a display screen displaying the image overlapped with a content corresponding to the identified dangerous region and a content corresponding to the work target; and outputting the display screen to a computing device associated with a person other than the user.

* * * * *